(12) United States Patent
Nishikawa et al.

(10) Patent No.: US 7,250,116 B2
(45) Date of Patent: Jul. 31, 2007

(54) LIQUID CRYSTAL COMPOSITION, POLYMERIZATION PRODUCT, RETARDATION PLATE AND ELLIPSOIDALLY POLARIZING PLATE

(75) Inventors: Hideyuki Nishikawa, Kanagawa (JP); Atsuhiro Ohkawa, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 251 days.

(21) Appl. No.: 10/798,385

(22) Filed: Mar. 12, 2004

(65) Prior Publication Data

US 2004/0178387 A1    Sep. 16, 2004

(30) Foreign Application Priority Data

Mar. 14, 2003    (JP) .............................. 2003-070304
Mar. 14, 2003    (JP) .............................. 2003-070305

(51) Int. Cl.
*C09K 19/52* (2006.01)
*C09K 19/54* (2006.01)
*C09K 19/38* (2006.01)
*G02B 5/30* (2006.01)
*G02F 1/13363* (2006.01)

(52) U.S. Cl. ............................. 252/299.01; 252/299.5; 428/1.1; 428/1.3; 428/1.31; 349/117

(58) Field of Classification Search ................. 428/1.1, 428/1.2, 1.31, 1.3; 252/299.01, 299.5; 349/117
See application file for complete search history.

(56) References Cited

U.S. PATENT DOCUMENTS 6,657,690 B2 *  12/2003  Hashimoto .................. 349/117

7,153,548 B2 *  12/2006  Nishikawa et al. .......... 428/1.1
7,169,325 B2 *   1/2007  Nishikawa et al. ...... 252/299.01
2004/0219305 A1*  11/2004  Nishikawa et al. .......... 428/1.2

FOREIGN PATENT DOCUMENTS

| JP | 2-264905 A | 10/1990 |
|---|---|---|
| JP | 11-60972 A | 3/1993 |
| JP | 08-286204 | * 11/1996 |
| JP | 2001-081465 A | 3/2001 |
| JP | 2002-6138 A | 1/2002 |
| JP | 2002-174730 A | 6/2002 |

OTHER PUBLICATIONS

English translation for JP 08-286204 by computer, http://www4.ipdl.ncipi.go.jp/Tokujitu/PAJdetail.ipdl?N0000=60&N0120=01&N2001=2&N3001=H08-286204.*

* cited by examiner

*Primary Examiner*—Shean C Wu
(74) *Attorney, Agent, or Firm*—Buchanan Ingersoll & Rooney PC

(57) ABSTRACT

A biaxial liquid crystal composition containing a liquid crystal compound and a refractive index-controlling agent, which is capable of developing a biaxial liquid crystal phase, and has a value of $(nx-ny)/(ny-nz)$ and a value of $(nx0-ny0)/(ny0-nz0)$ different from each other wherein nx, ny and nz respectively represent refractive indexes along directions of three axes of the biaxial liquid crystal composition in an order of magnitude, and nx0, ny0 and nz0 respectively represent refractive indexes along directions of three axes of the biaxial composition obtained by excluding the refractive index-controlling agent from the biaxial liquid crystal composition in an order of magnitude.

15 Claims, No Drawings

LIQUID CRYSTAL COMPOSITION, POLYMERIZATION PRODUCT, RETARDATION PLATE AND ELLIPSOIDALLY POLARIZING PLATE

FIELD OF THE INVENTION

The present invention relates to a biaxial liquid crystal composition, especially relates to a biaxial liquid crystal composition in which refractive indexes along the directions of three axes are controlled and which is extremely useful for preparing a retardation plate.

Also, it relates to a polymerization product obtained from the biaxial liquid crystal composition, and to a retardation plate and an ellipsoidally polarizing plate using the biaxial liquid crystal composition.

BACKGROUND OF THE INVENTION

Biaxial films having controlled refractive indexes along the directions of three axes are useful in the optical field utilizing polarized light. In particular, in the field of liquid crystal display, such films permitting precise control of polarized light are of a great importance.

In the case of preparing such optically biaxial film, it is a popular process to obtain the film by biaxially stretching a film obtained from a polymer (see, for example, JP-A-2-264905). In the case of obtaining a biaxial film by the biaxially stretching technique, the refractive indexes along the directions of three axes can be controlled to desired levels with comparative ease because the refractive indexes can be controlled through draw ratio.

On the other hand, it has recently been proposed to obtain a biaxial film by using a biaxial liquid crystal (see, for example, JP-A-2002-6138 and JP-A-2002-174730). In comparison with biaxially stretched films which have conventionally been often used, the biaxial film using the biaxial liquid crystal has a merit of reducing its thickness so much that using the biaxial liquid crystal for the biaxial film is a useful means for reducing the thickness or weight of a device.

However, in the case of preparing a biaxial film by using a biaxial liquid crystal, there arises a problem that refractive indexes of the film along the directions of three axes can not arbitrarily be controlled. This is attributed to that the refractive indexes of a resultant biaxial film along the directions of three axes are almost decisively determined by the refractive indexes of the liquid crystal phase-developing compound (liquid crystal compound) along the directions of three axes. That is, in order to adjust the refractive indexes of the biaxial film along the directions of three axes to desired levels, it is the only method to synthesize a liquid crystal compound having desired refractive indexes. However, in comparison with the number of compounds developing uniaxial liquid crystal, the number of compounds capable of developing biaxial liquid crystal is so small (see, for example, D. Demus, J. Goodby, et al., *Handbook of Liquid Crystals* Vol. 2B; Low Molecular Weight Liquid Crystals II, WILEY-VCH p. 933-943) that it has been extremely difficult to arbitrarily control the refractive indexes along the directions of three axes.

SUMMARY OF THE INVENTION

Therefore, an object of the invention is to provide a biaxial liquid crystal composition which permits to arbitrarily control the refractive indexes of a biaxial liquid crystal composition along the directions of three axes without changing the biaxial liquid crystal compound. Further, another object of the invention is to provide a polymerization product, a retardation plate and an ellipsoidally polarizing plate using the biaxial liquid crystal composition.

The above-described problems can be solved by adding a proper refractive index-controlling agent to the biaxial liquid crystal composition to thereby make the refractive indexes along the directions of three axes desired levels. Specifically, the problems can be solved by the following (1) to (14):

(1) A biaxial liquid crystal composition containing a liquid crystal compound and a refractive index-controlling agent, which is capable of developing (exhibiting) a biaxial liquid crystal phase, and which has a value of $(nx-ny)/(ny-nz)$ and a value of $(nx0-ny0)/(ny0-nz0)$ different from each other wherein nx, ny and nz respectively represent refractive indexes along the directions of three axes of the biaxial liquid crystal composition in the order of magnitude, and nx0, ny0 and nz0 respectively represent refractive indexes along the directions of three axes of the biaxial composition obtained by excluding the refractive index-controlling agent from the biaxial liquid crystal composition in the order of magnitude.

(2) The biaxial liquid crystal composition as described in (1), wherein the value of $(nx-ny)/(ny-nz)$ and the value of $(nx0-ny0)/(ny0-nz0)$ satisfy the following formula (I):

$$(nx-ny)/(ny-nz) > (nx0-ny0)/(ny0-nz0) \quad \text{formula (I)}$$

(3) The biaxial liquid crystal composition as described in (1) or (2), wherein the refractive index-controlling agent contains a rod-like compound.

(4) The biaxial liquid crystal composition as described in one of (1) to (3), wherein the refractive index-controlling agent is represented by the following formula (I-C):

$$Q1\text{-}L1\text{-}Cy\text{-}1L2\text{-}(Cy2\text{-}L3)n\text{-}Cy3\text{-}L4\text{-}Q2 \quad \text{formula (I-C)}$$

wherein Q1 and Q2 each independently represents a polymerizable group, L1 and L4 each independently represents a divalent linking group, L2 and L3 each represents a single bond or a divalent linking group, Cy1, Cy2 and Cy3 each independently represents a divalent cyclic group, and n represents 0, 1 or 2.

(5) The biaxial liquid crystal composition as described in (1), wherein the value of $(nx-ny)/(ny-nz)$ and the value of $(nx0-ny0)/(ny0-nz0)$ satisfy the following formula (II):

$$(nx-ny)/(ny-nz) < (nx0-ny0)/(ny0-nz0) \quad \text{formula (II)}$$

(6) The biaxial liquid crystal composition as described in (1) or (5), wherein the refractive index-controlling agent contains a discotic compound.

(7) The biaxial liquid crystal composition as described in (1), (5) or (6), wherein the refractive index-controlling agent is represented by the following formula (I-D):

$$D(\text{-}L\text{-}Q)n \quad \text{formula (I-D)}$$

wherein D represents a disc-like core, L represents a divalent linking group, Q represents a polymerizable group, and n represents an integer of 4 to 12.

(8) The biaxial liquid crystal composition as described in one of (1) to (7), wherein the refractive index-controlling agent develops a liquid crystal phase.

(9) The liquid crystal composition as described in one of (1) to (8), wherein the biaxial liquid crystal compound has a polymerizable group.

(10) The biaxial liquid crystal composition as described in one of (1) to (9), wherein the refractive index-controlloing agent has a polymerizable group.
(11) The biaxial liquid crystal composition as described in one of (1) to (10), wherein the biaxial liquid crystal phase which the biaxial liquid crystal composition develops is a biaxial nematic liquid crystal phase.
(12) A retardation plate which comprises a transparent support having provided thereon an alignment film and at least one optically anisotropic layer, with the optical anisotropic layer is made from the biaxial liquid crystal composition described in one of (1) to (11).
(13) An ellipsoidally polarizing plate having the retardation plate described in (12) and a polarizing film.
(14) A polymerization product obtained by polymerizing the biaxial liquid crystal composition described in (9) or (10).

DETAILED DESCRIPTION OF THE INVENTION

The invention is described in more detail below.

[Liquid Crystal Compound]

The liquid crystal compound contained in the biaxial liquid crystal composition of the invention is a liquid crystal compound which shows optically biaxial properties by itself or as a mixture with other compounds. In other words, it is a liquid crystal compound which, by it self, or as the mixture, forms a liquid crystal phase whose refractive indexes nx1, ny1 and nz1 in the direction of three axes are different from each other and satisfy the relation of, for example, nx1>ny1>nz1.

In the case of using the liquid crystal compound to be used in the invention for a retardation plate, those compounds are preferred which have the above-mentioned properties and, at the same time, show good mono-domain properties for obtaining uniform, defect-free alignment. In case where the mono-domain properties are poor, there results a poly-domain structure which produces an alignment defect at the boundary between domains to cause scattering of light. This can lead to reduction in transmission of the retardation plate, thus not being desirable.

As a biaxial liquid crystal phase which the liquid crystal compound to be used in the invention shows, there may be illustrated a biaxial nematic phase, a biaxial smectic A phase and a biaxial smectic C phase. Of these liquid crystal phases, a biaxial nematicphase (Nb) showing good mono-domain properties is preferred. The biaxial nematic phase is a kind of a liquid crystal phase which a nematic liquid crystal compound can develop, and which shows a state wherein, when the space of the liquid crystal phase is defined by x-axis, y-axis and z-axis, free rotation of the liquid crystal compound around the y-axis in xz-plane and free rotation thereof around the z-axis in xy-plane are prohibited.

The liquid crystal compound to be used in the invention may be a low-molecular liquid crystal compound or a high-molecular liquid crystal compound.

The liquid crystal compound preferably has a polymerizable group. Particularly, in the case of using the liquid crystal compound for a retardation plate, the low-molecular compound is preferably a polymerizable compound in order to conduct fixation of alignment. Also, the high-molecular compound is preferably a polymerizable compound in order to conduct fixation of alignment but, when the high-molecular compound has a glass transition point of 30° C. or above, the compound may not necessarily be polymerizable. Examples of the polymerizable group of the liquid crystal compound are same as the polymerizable groups Q-1 to Q17 listed below as examples of the polymerizable group of the polymerizable rod-like liquid crystal compounds.

In the invention, only a compound which develops a biaxial liquid crystal phase by itself (biaxial liquid crystal compound) may be used, or two or more kinds of biaxial liquid crystal compounds may be used in combination. For example, it is possible to use a polymerizable biaxial liquid crystal compound and a high-molecular liquid crystal compound in combination. Further, it is also possible to mix to use two or more kinds of compounds which independently do not develop the biaxial liquid crystal phase but which, when combined with each other, can develop the biaxial liquid crystal phase (a specific example being a mixture of a uniaxial discotic liquid crystal compound and a rod-like liquid crystal compound). In the invention, it is preferable to use at least one biaxial liquid crystal compound.

As specific examples of the biaxial liquid crystal compound, there are illustrated, for example, compounds described in *Yuki Gosei Kagaku*, vol. 49, No. 5 (1991), pp. 124-143, and compounds described in study reports by D. W. Bruce et al., [*AN EU-SPONSORED 'OXFORD WORKSHOP ON BIAXIAL NEMATICS*' (St Benet's Hall, University of Oxford 20-22 Dec. , 1996), p 157-293], study reports by S. CHANDRASEKHAR et al., (A Thermotropic Biaxial Nematic Liquid Crystal; *Mol. Cryst. Liq. Cryst.,* 1988, Vol. 165, pp. 123-130), and D. Demus, J. Goodby et al., Handbook of Liquid Crystals, Vol. 2B: Low Molecular Weight Liquid Crystals II, WILEY-VCH, pp. 933-943. It is also possible to introduce a polymerizable group into the compounds for use.

Specific examples of the low-molecular liquid crystal compound having a polymerizable group include compounds described in JP-A-2002-174730.

Also, specific examples of the low-molecular liquid crystal compound to be preferably used in the invention are illustrated below which, however, are not to be construed as limitative of the invention.

m-1

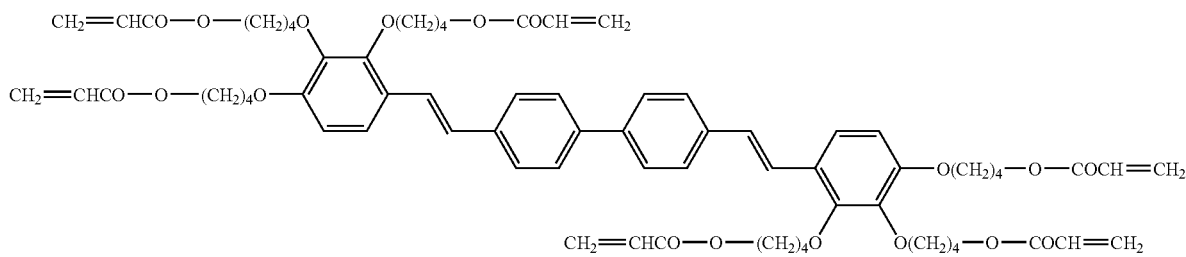

-continued
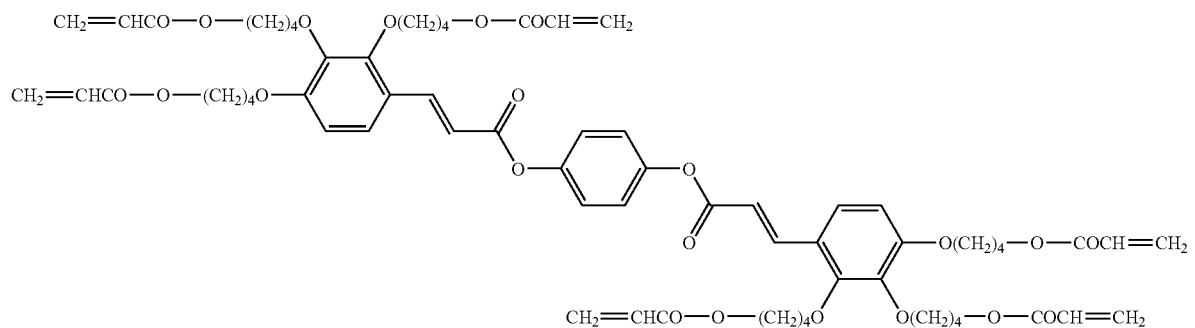
m-2
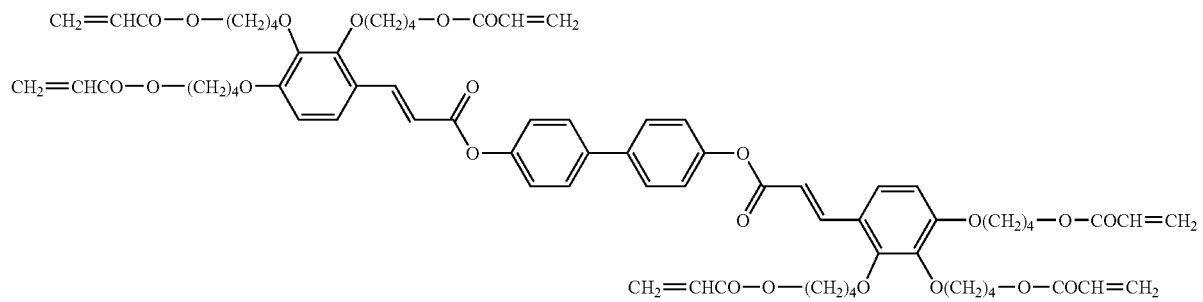
m-3
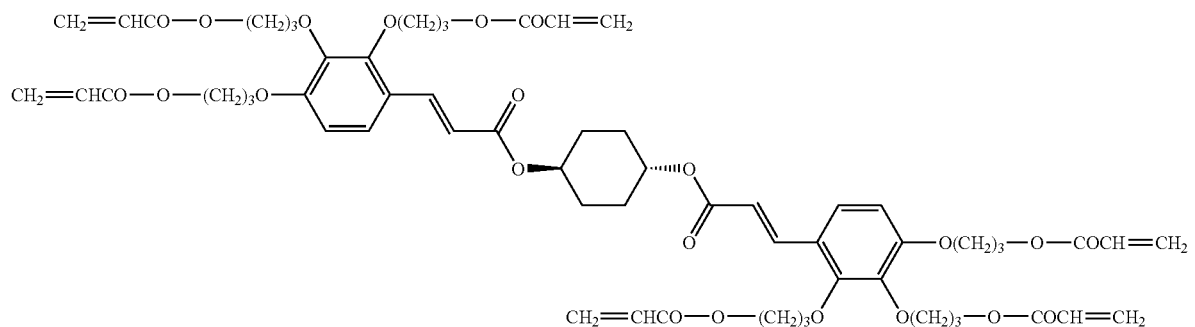
m-4
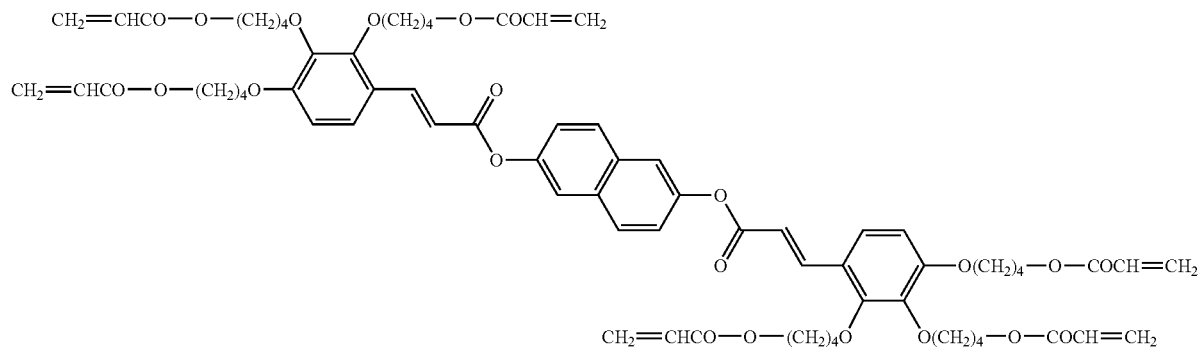
m-5

-continued
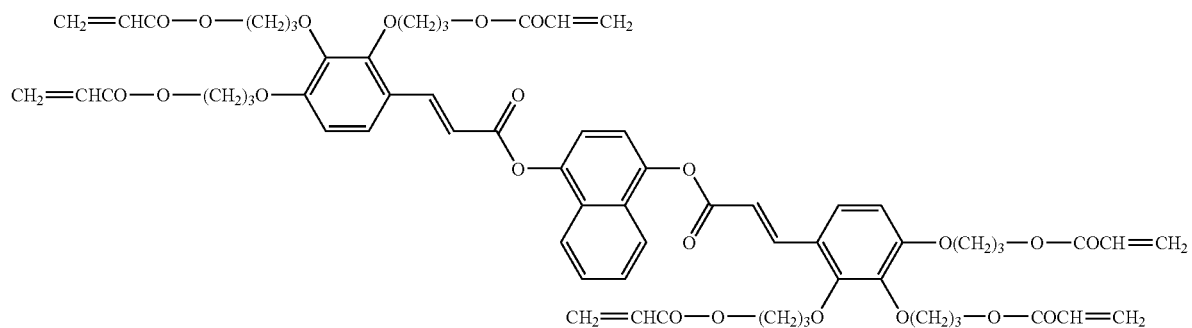
m-6
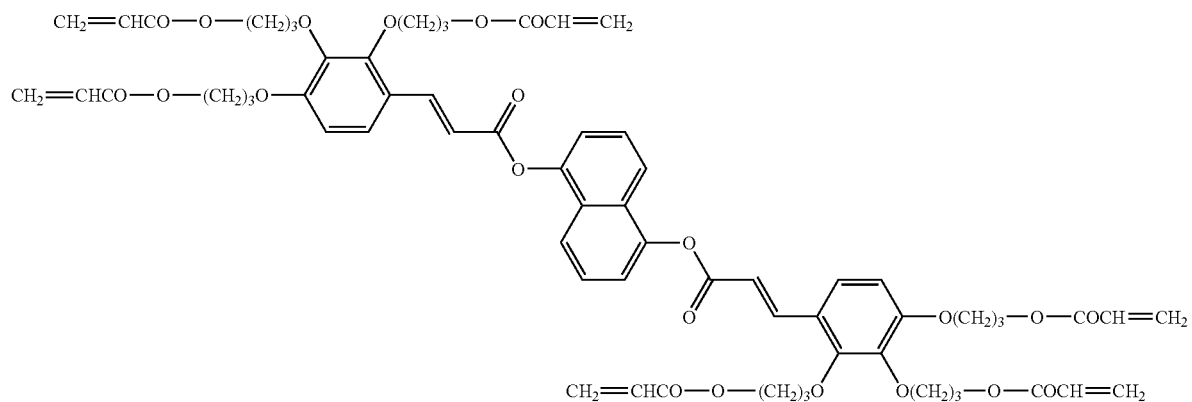
m-7
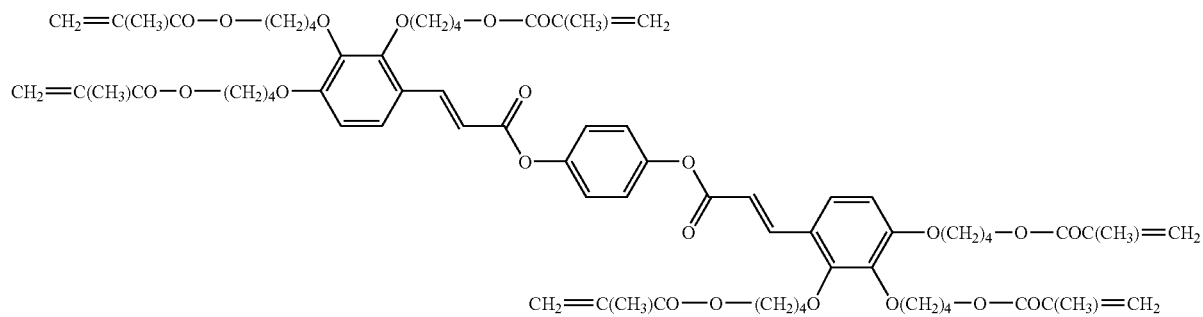
m-8
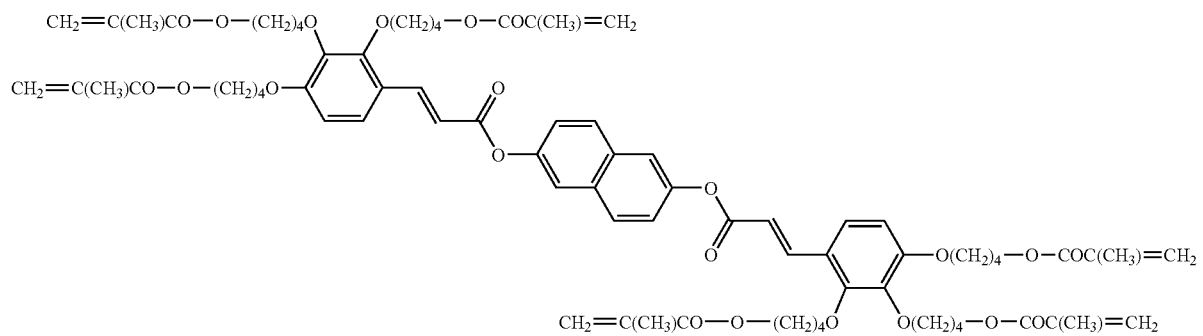
m-9

-continued
m-10
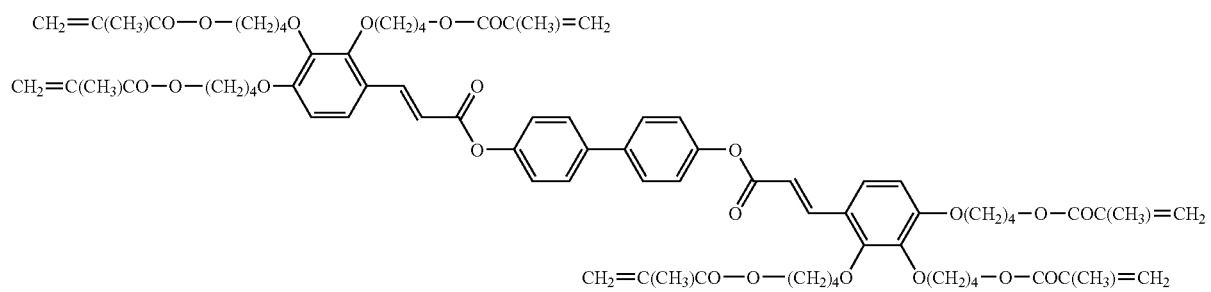
m-11
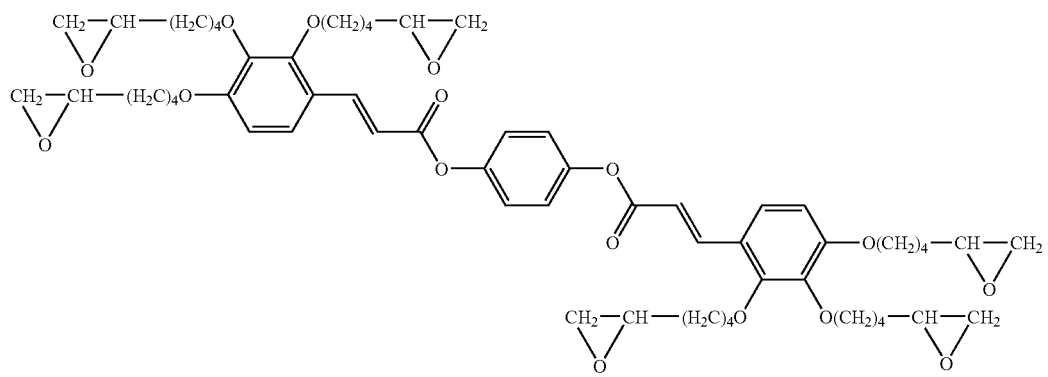
m-12
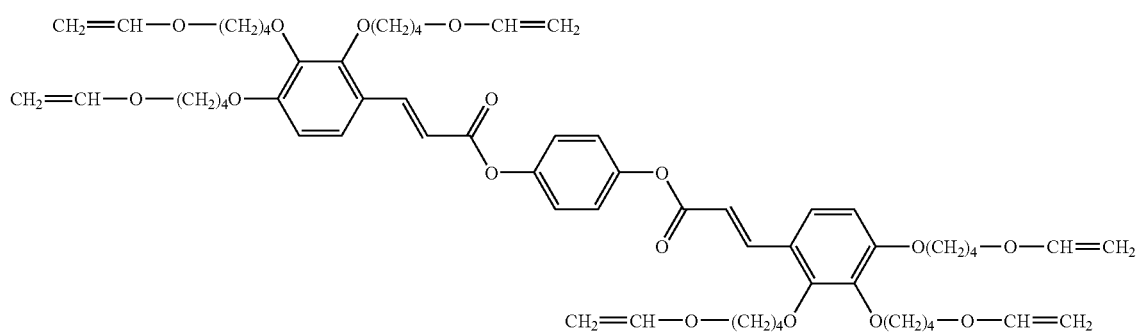
m-13
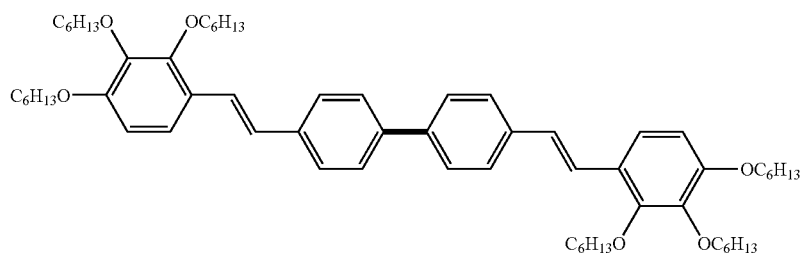
m-14
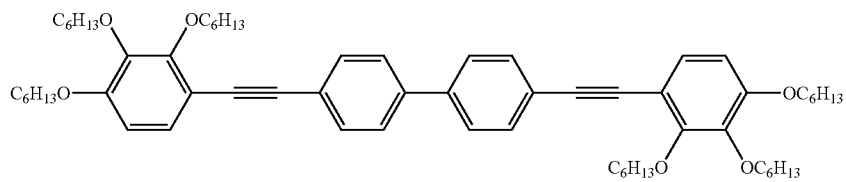

-continued
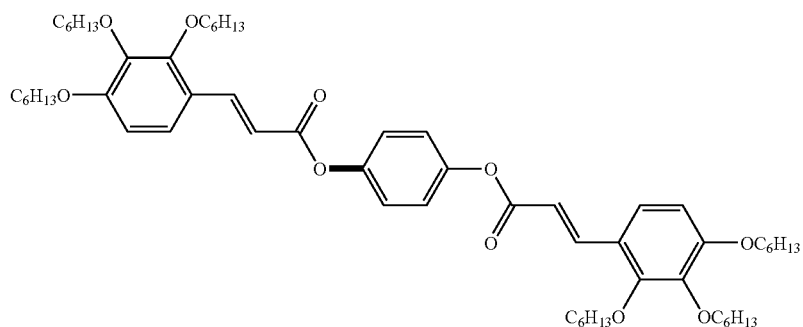
m-15
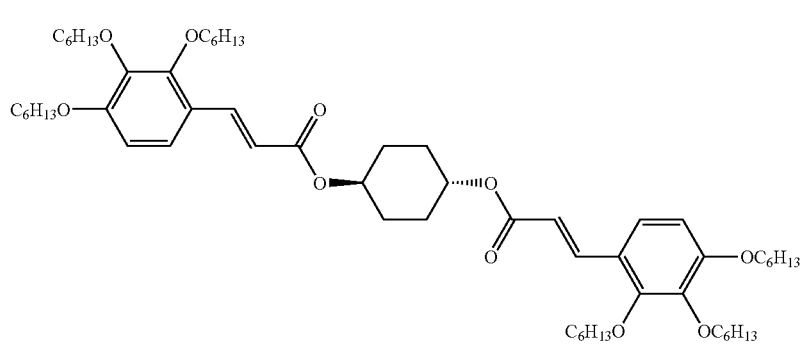
m-16
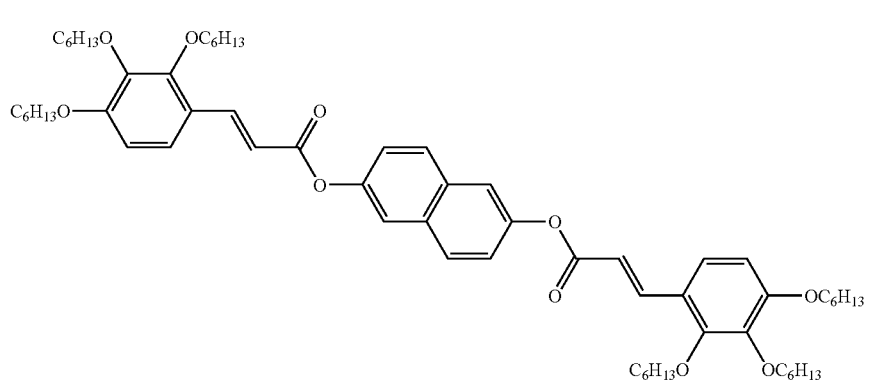
m-17
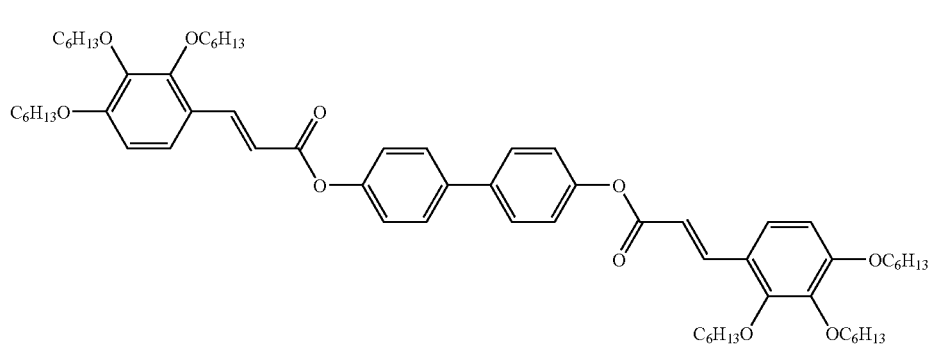
m-18

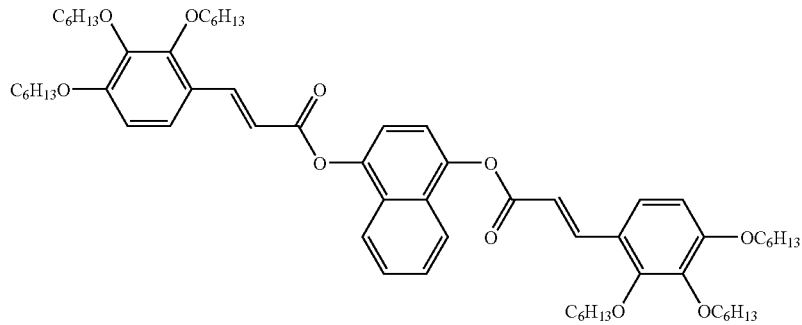

m-19

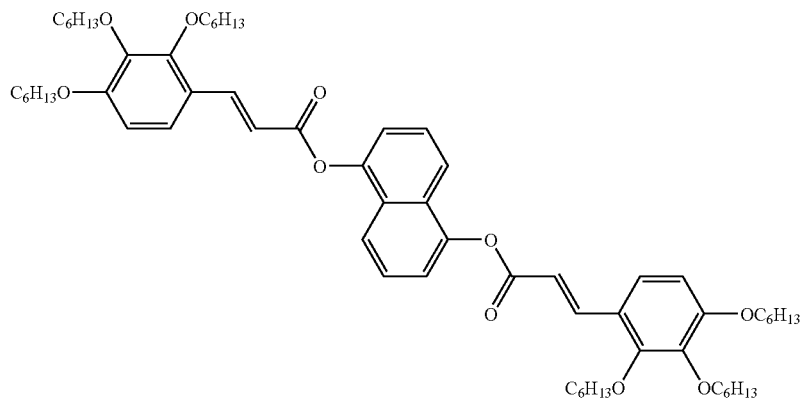

m-20

As specific examples of the high-molecular liquid crystal compound, there are illustrated, for example, those compounds which are described in study reports of H. F. Leube et al., (Optical investigations on a liquid-crystalline side-chain polymer with biaxial nematic and biaxial smectic main-chain polymers with exhibition of biaxial fluctuation in nematic phase; *Macromolecules,* 1998, Vol. 31, pp. 3537-3541).

Also, specific examples of the high-molecular liquid crystal compound to be preferably used in the invention other than the above-described compounds are illustrated below which, however, are not to be construed as limitative of the invention.

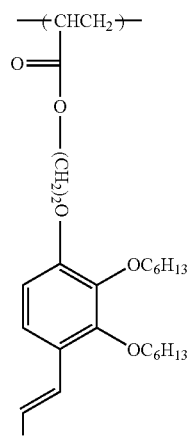

P-1

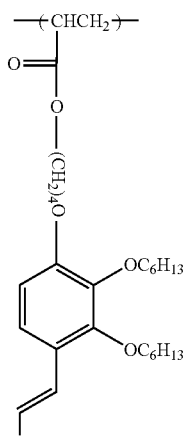

P-2

-continued
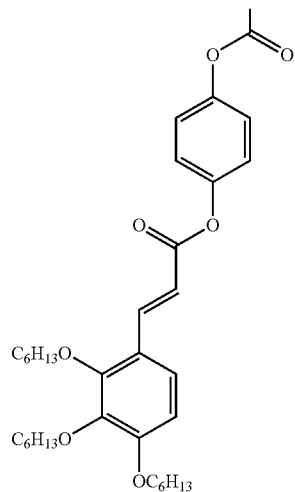
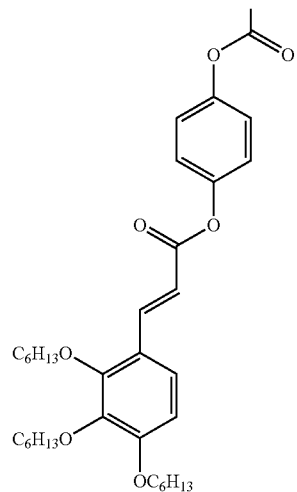
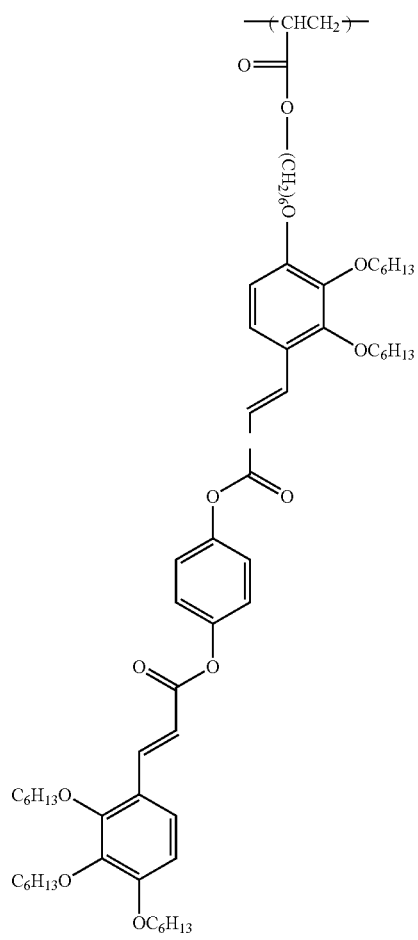
P-3
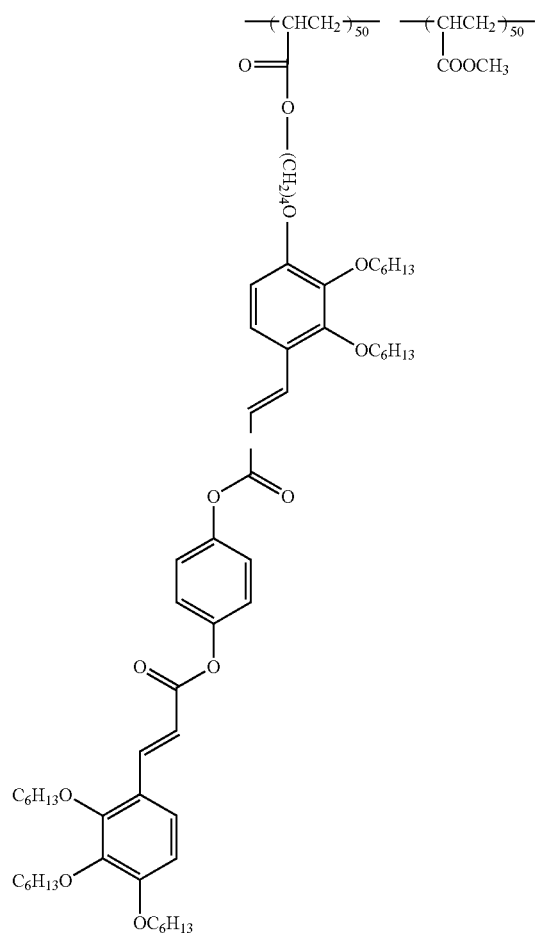
P-4

-continued
P-5
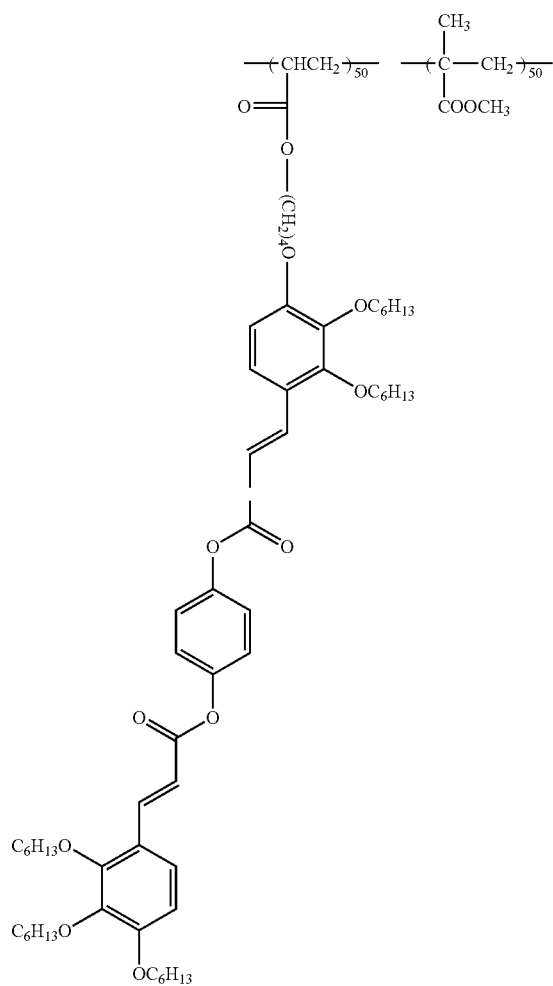
P-6
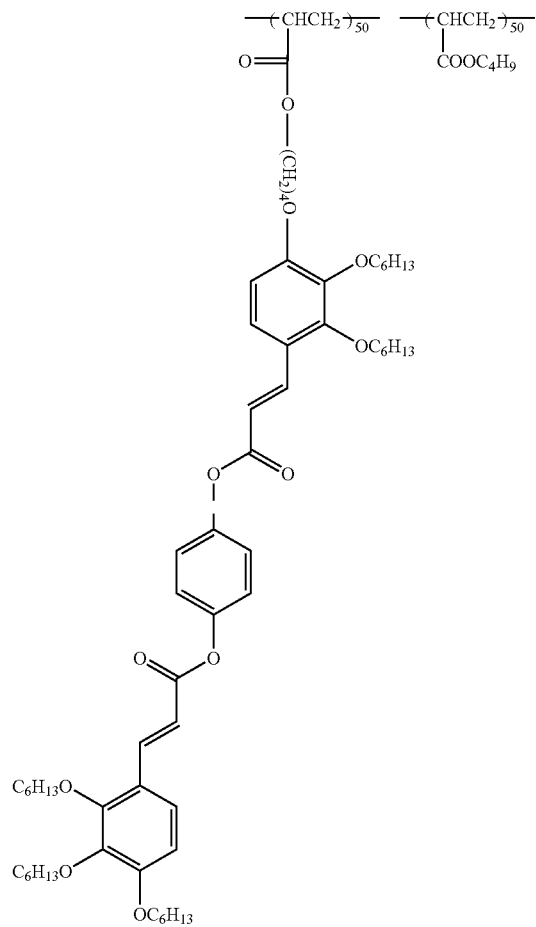
P-7
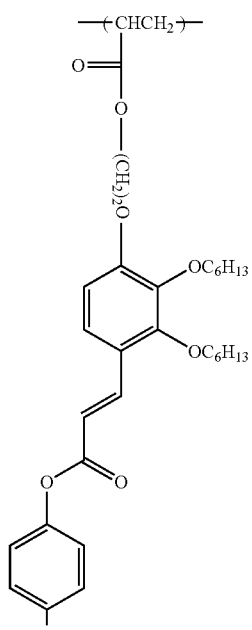
P-8
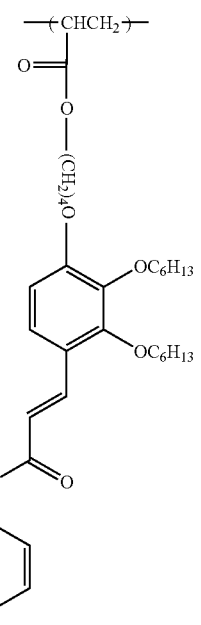

-continued
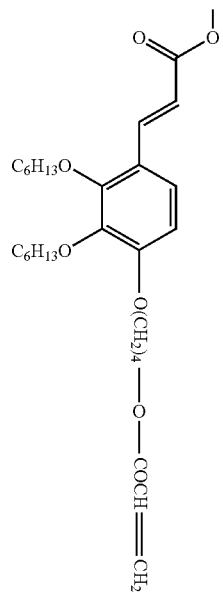
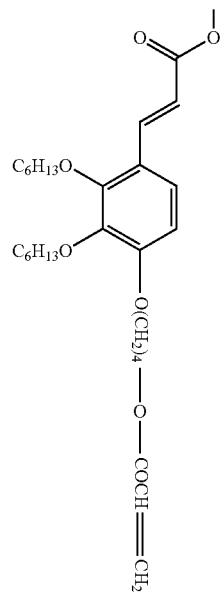
P-9
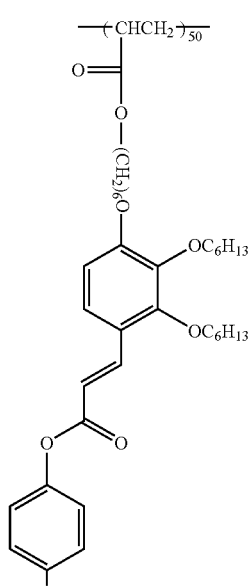
P-10
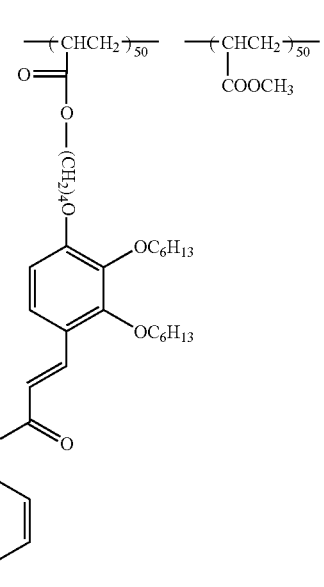

-continued
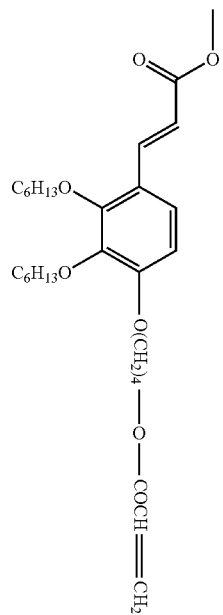
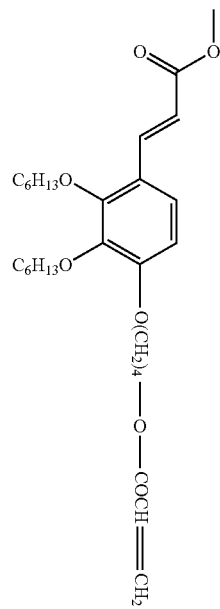
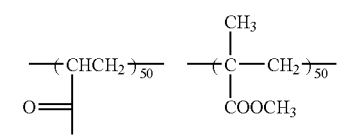
P-11
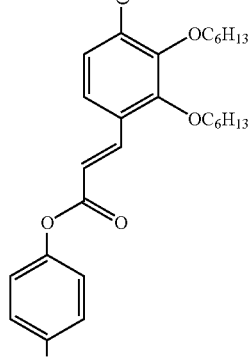
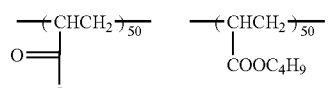
P-12
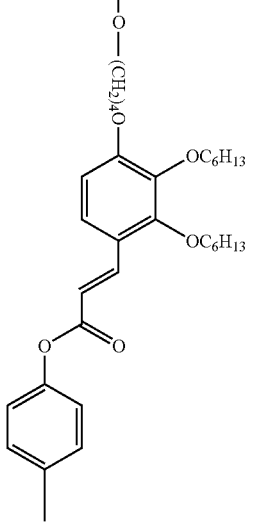

-continued
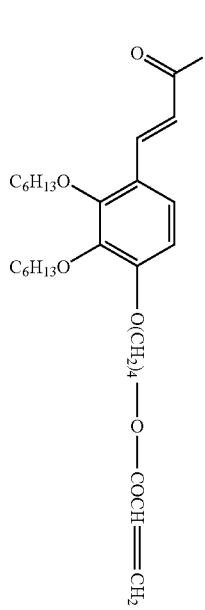
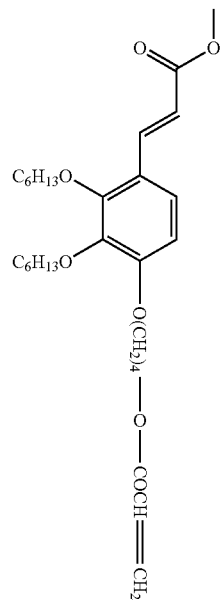
P-13
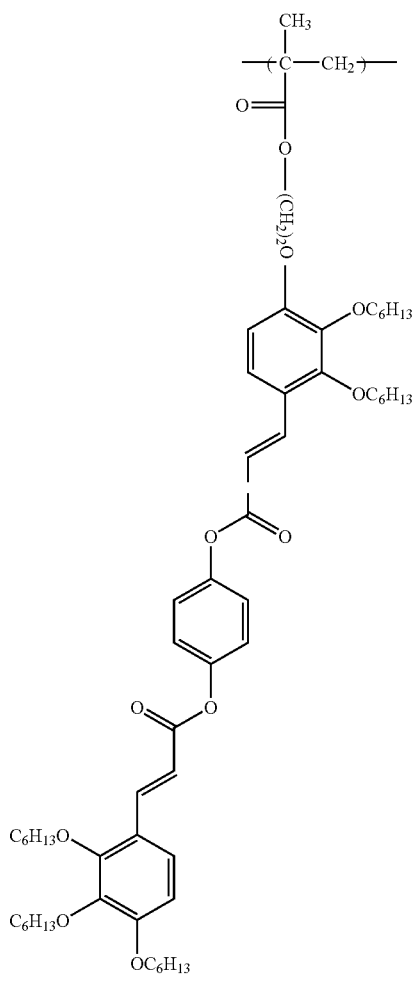
P-14
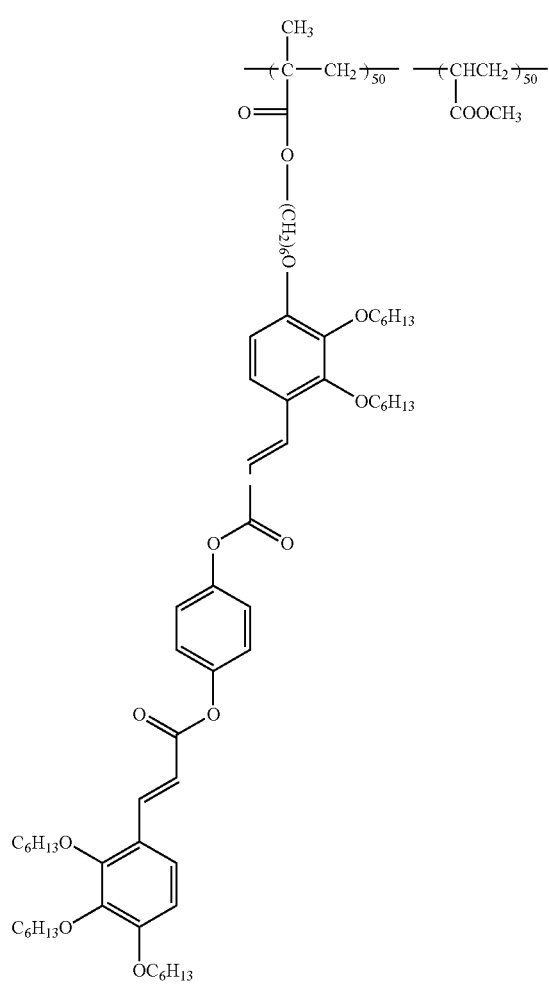

-continued
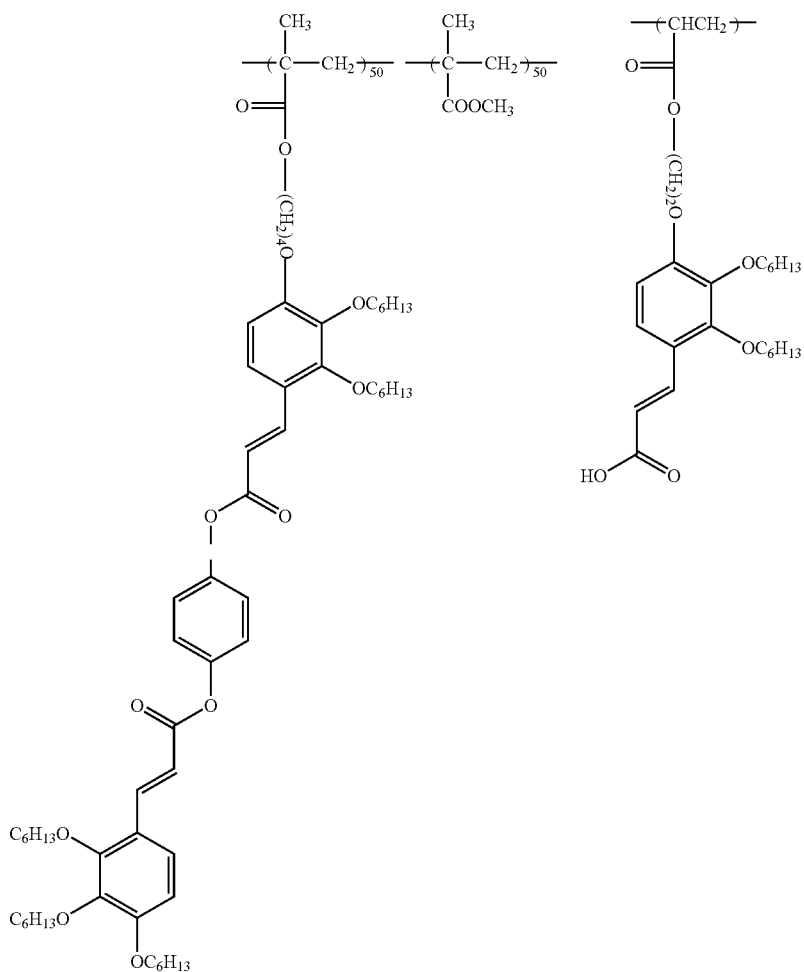
P-15
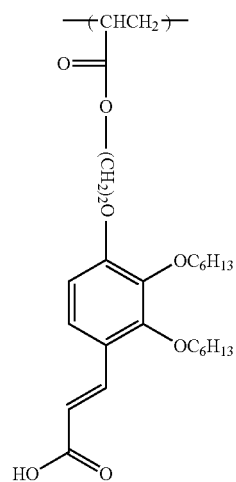
P-16
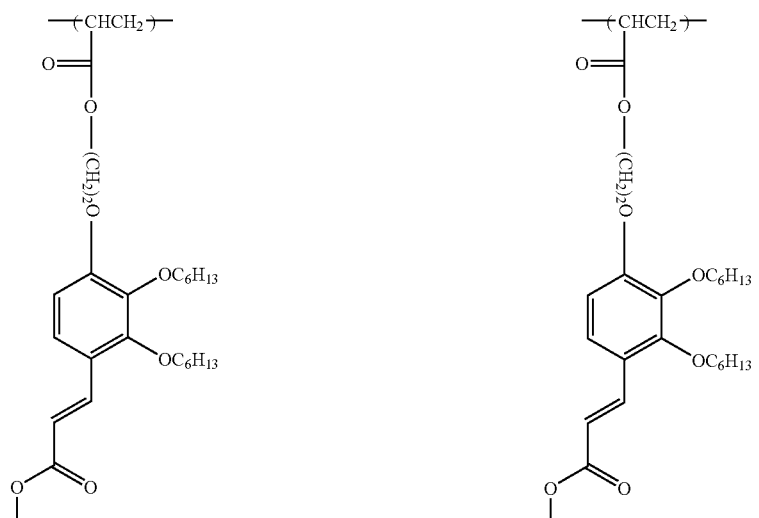
P-17 P-18

-continued
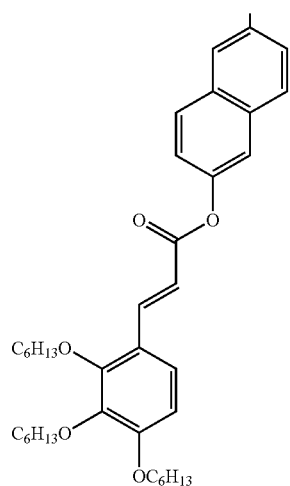
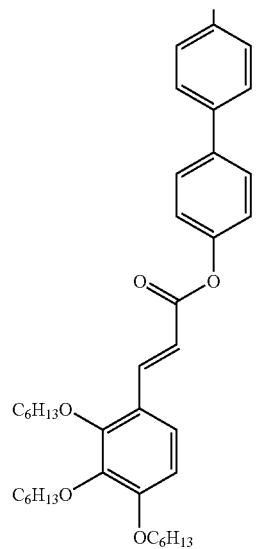
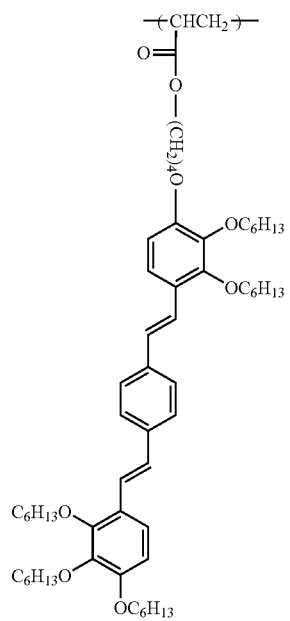
P-19
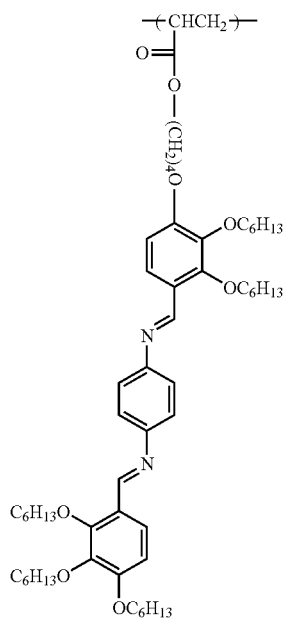
P-20

-continued
P-21
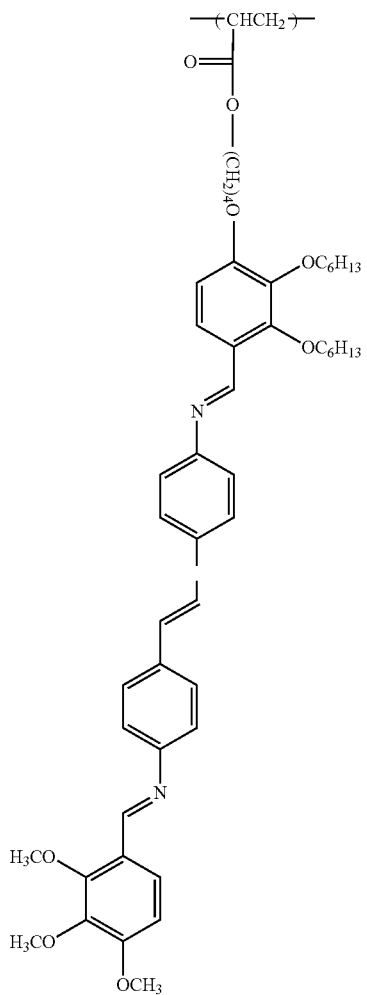
P-22
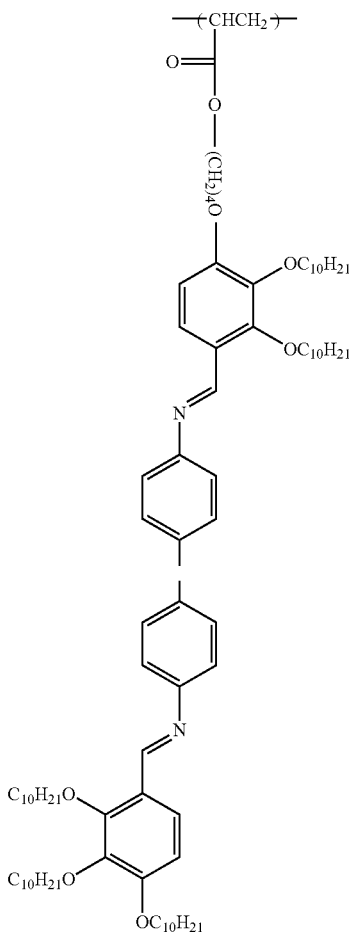
P-23
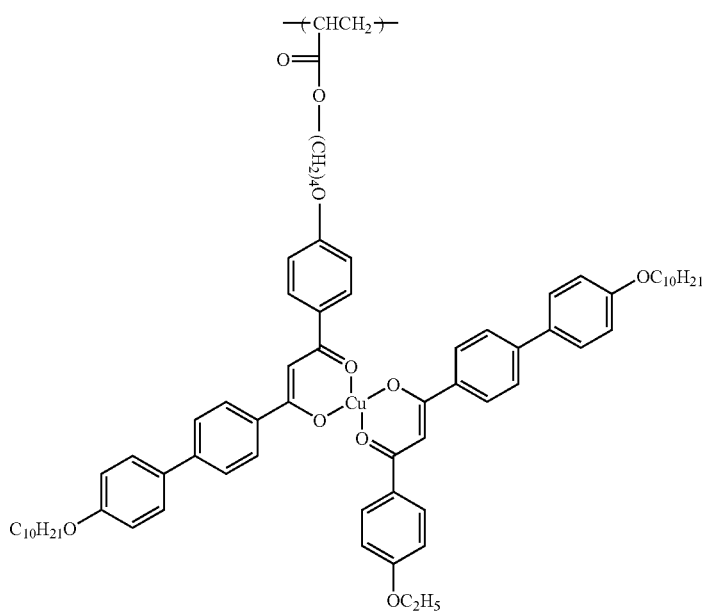

-continued

P-24

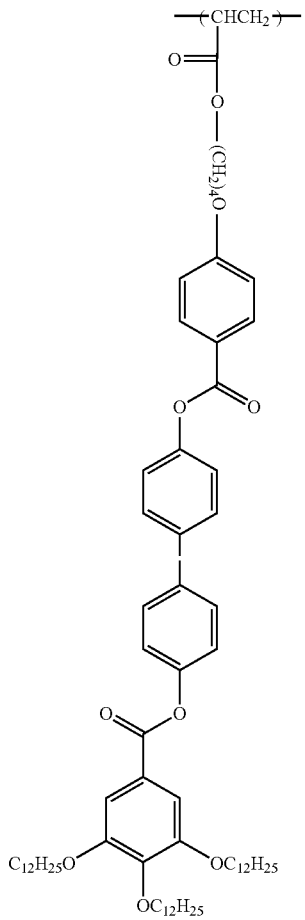

[Refractive Index-controlling Agent]

In the invention, the refractive index-controlling agent means a compound which, when added to a biaxial liquid crystal composition, can change the refractive indexes of the composition along the directions of three axes. That is, refractive indexes of a biaxial liquid crystal composition (containing the refractive index-controlling agent) along the directions of three axes (nx, ny and nz in the order of magnitude) obtained by adding the refractive index-controlling agent to the biaxial liquid crystal composition can be changed in comparison with the refractive indexes of the composition along the directions of three axes (nx0, ny0 and nz0 in the order of magnitude) before addition of the refractive index-controlling agent. Specifically, it is possible to make different the value of (nx−ny)/(ny−nz) and the value of (nx0−ny0)/(ny0−nz0).

It is also possible to satisfy the following formula (I) or the following formula (II) by selecting molecular structure of the refractive index-controlling agent.

In the biaxial liquid crystal composition of the invention, in case the refractive indexes along the directions of three axes, the indexes being changeable due to an addition of refractive index-controlling agents, satisfy the following formula (I), it is preferable that the value of (ny−nz) does not come close to 0 so as to function as a biaxial liquid crystal. The value of (ny−nz) is more preferably 0.005 or more.

In the biaxial liquid crystal composition of the invention, in case the refractive indexes along the directions of three axes, the indexes being changeable due to an addition of refractive index-controlling agents, satisfy the following formula (II), it is preferable that the value of (nx−ny) does not come close to 0 so as to function as a biaxial liquid crystal. The value of (nx−ny) is more preferably 0.005 or more.

$(nx-ny)/(ny-nz)>(nx0-ny0)/(ny0-nz0)$   Formula (I)

$(nx-ny)/(ny-nz)<(nx0-ny0)/(ny0-nz0)$   Formula (II)

In the above formulae (I) and (II), nx, ny and nz represent refractive indexes along the directions of the three axes of the biaxial liquid crystal composition containing both the biaxial liquid crystal composition and the refractive index-controlling agent, with nx, ny and nz being in the relation of nx>ny>nz. Also, nx0, ny0 and nz0 represent refractive indexes along the directions of the three axes of the biaxial composition, obtained by excluding the refractive index-controlling agent from the above-described biaxial liquid crystal composition having the refractive indexes of nx>ny>nz, with nx0, ny0 and nz0 being in the relation of nx0>ny0>nz0.

A biaxial liquid crystal phase may undergo change in the values of nx, ny, nz, nx0, ny0 and nz0 depending upon kinds of the liquid crystal compounds or the additives added to the liquid crystal composition. In the invention, nx, ny, nz, nx0, ny0 and nz0 of such compositions mean the values obtained by measuring at a temperature 20° C. under the upper limit temperature of a temperature range wherein each composition develop a biaxial liquid crystal phase (liquid crystal temperature range). In the case where either of the compositions has a liquid crystal temperature range lower than 20° C., the values are those obtained by measuring at a temperature 10° C. under the upper limit temperature of the liquid crystal phase and, in the case where either of the composition has a liquid crystal temperature range lower than 10° C., the values are those obtained by measuring at a temperature 5° C. under the upper limit temperature of the liquid crystal phase and, in the case where either of the composition has a liquid crystal temperature range lower than 5° C., the values are those obtained by measuring at a temperature 2° C. under the upper limit temperature of the liquid crystal phase.

The refractive index-controlling agent satisfying the above formula (I) is preferably a rod-like compound. The rod-like compound is a compound having a rod-like molecular structure wherein an aromatic ring or aliphatic ring forms a core, and may be a compound wherein a substituent is introduced into the rod-like molecule or, further, maybe a compound wherein side chain moiety of the rod-like molecule is substituted by other substituent. Examples of such substituent are listed in the Group A below.

(Group A)

Examples of such substituent include a hydrogen atom, an alkyl group (e.g., a methyl group, an ethyl group, an isopropyl group or a tert-butyl group), an alkenyl group (e.g., a vinyl group, an allyl group, a 2-butenyl group or a 3-pentenyl group), an alkynyl group (e.g., a propargyl group or a 3-pentynyl group), an aryl group (e.g., a phenyl group, a p-methylphenyl group or a naphthyl group), a substituted or unsubstituted amino group (e.g., an unsubstituted amino group, a methylamino group, a dimethylamino group, a diethylamino group or an aniline group), an alkoxy group (e.g., a methoxy group, an ethoxy group or a butoxy group), an aryloxy group (e.g., a phenyloxy group or a 2-naphthyloxy group), an acyl group (e.g., an acetyl group, a benzoyl group, a formyl group or a pivaloyl group), an alkoxycarbonyl group (e.g., a methoxycarbonyl group or an ethoxycarbonyl group), an aryloxycarbonyl group (e.g., a phenyloxycarbonyl group), an acyloxy group (e.g., an acetoxy group or a benzoyloxy group), an acylamino group (e.g., an acetylamino group or a benzoylamino group), an alkoxycarbonylamino group (e.g., a methoxycarbonylamino group), an aryloxycarbonylamino group (e.g., a phenyloxycarbonylamino group), a sulfonylamino group (e.g., a methanesulfonylamino group or a benzenesulfonylamino group), a sulfamoyl group (e.g., a sulfamoyl group, a methylsulfamoyl group, a dimethylsulfamoyl group or a phenylsulfamoyl group), a carbamoyl group (e.g., an unsubstituted carbamoyl group, a methylcarbamoyl group, a diethylcarbamoyl group or a phenylcarbamoyl group), an alkylthio group (e.g., a methylthio group or an ethylthio group), an arylthio group (e.g., a phenylthio group), a sulfonyl group (e.g., a mesyl group or a tosyl group), a sulfinyl group (e.g., a methanesulfinyl group or a benzenesulfinyl group), a ureido group (e.g. , an unsubstituted ureido group, a methyl ureido group or a phenylureido group), a phosphoric acid amido group (e.g., diethylphosphoric acid amido group or a phenyl phosphoric acid amido group), a hydroxy group, a mercapto group, a halogen atom (e.g., a fluorine atom, a chlorine atom, a bromine atom or an iodine atom), a cyano group, a sulfo group, a carboxyl group, a nitro group, a hydroxamic acid group, a sulfino group, a hydrazine group, an imino group, a hetero ring group (e.g., a hetero ring group having a hetero atom such as a nitrogen atom, an oxygen atom or a sulfur atom, such as an imidazolyl group, a pyridyl group, a quinolyl group, a furyl group, a piperidyl group, a morpholino group, a benzoxazolyl group, a benzimidazolyl group or a benzothiazolyl group) and a silyl group (e.g., a trimethylsilyl group or a triphenylsilyl group). These substituents may further be substituted by these substituents. In the case where two or more substituents exist, they may be the same or different from each other and, if possible, may be connected to each other to form a ring.

Also, the side chain moiety of the rod-like molecule is a substituent bound to the aromatic ring or the aliphatic ring. Examples of such substituent are listed in the Group B below.

(Group B)

Examples of such substituent include an alkyl group (e.g., a methyl group, an ethyl group, an isopropyl group or a tert-butyl group), an alkenyl group (e.g., a vinyl group, an allyl group, a 2-butenyl group or a 3-pentenyl group), an alkynyl group (e.g., a propargyl group or a 3-pentynyl group), an amino group (e.g., an unsubstituted amino group, a methylamino group, a dimethylamino group, a diethylamino group or an aniline group), an alkoxy group (e.g., a methoxy group, an ethoxy group or a butoxy group), an acyl group (e.g., an acetyl group, a benzoyl group, a formyl group or a pivaloyl group), an alkoxycarbonyl group (e.g., a methoxycarbonyl group or an ethoxycarbonyl group), an acyloxy group (e.g., an acetoxy group or a benzoyloxy group), an acylamino group (e.g., an acetylamino group or a benzoylamino group), a carbamoyl group (e.g., an unsubstituted carbamoyl group, a methylcarbamoyl group, a diethylcarbamoyl group or a phenylcarbamoyl group), a hydroxyl group, a halogen atom (e.g., a fluorine atom, a chlorine atom, a bromine atom or an iodine atom), a cyano group, a carboxyl group and a silyl group (e.g., a trimethylsilyl group or a triphenylsilyl group).

The refractive index-controlling agent is preferably a compound which has a rod-like shape and which can develop a liquid crystal phase, that is, a rod-like liquid crystal compound.

Examples of the rod-like liquid crystal compound include azomethines, azoxy compounds, cyanobiphenyls, cyanophenyl esters, benzoic acid esters, phenyl cycnohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles.

The liquid crystal phase developed by the rod-like liquid crystal compound is described in detail in, for example, *Ekisho Binran* (published by Maruzen K. K. in year 2000), chapter 2, and is exemplified by a nematic phase, a cholesteric phase and a smectic phase. A nematic phase is particularly preferred as the rod-like liquid crystal phase.

The refractive index-controlling agent preferably has a polymerizable group for fixing alignment of the liquid crystal compound contained in the biaxial liquid crystal composition, with a rod-like liquid crystal compound having a polymerizable group being particularly preferred.

As the rod-like liquid crystal compound having a polymerizable group, there may be used those compounds which are described in *Makromol. Chem.*, vol. 190, p. 2255 (1989), *Advanced Materials*, vol. 5, p. 107 (1993), U.S. Pat. Nos. 4,683,327, 5,622,648 and 5,770,107, WO95/22586, WO95/

24455, WO97/00600, WO98/23580, WO98/52905, JP-A-1-272551, JP-A-6-16616, JP-A-7-110469, JP-A-11-80081 and JP-A-2001-328973.

As the refractive index-controlling agent, rod-like liquid crystal compounds represented by the following formula (I-C) are particularly preferred.

Q1-L1-Cy1-L2-(Cy2-L3)n-Cy3-L4-Q2    Formula (I-C):

wherein Q1 and Q2 each independently represents a polymerizable group, L1 and L4 each independently represents a divalent linking group, L2 and L3 each represents a single bond or a divalent linking group, Cy1, Cy2 and Cy3 each independently represents a divalent cyclic group, and n represents 0, 1 or 2.

The polymerizable rod-like liquid crystal compounds represented by the formula (I-C) are further described below.

In the formula (I-C), Q1 and Q2 each independently represents a polymerizable group. Polymerization reaction of the polymerizable group is preferably addition polymerization (including ring-opening polymerization) or condensation polymerization. In other words, the polymerizable group is preferably a functional group capable of causing addition polymerization reaction or condensation polymerization reaction. Examples of the polymerizable group are shown below.

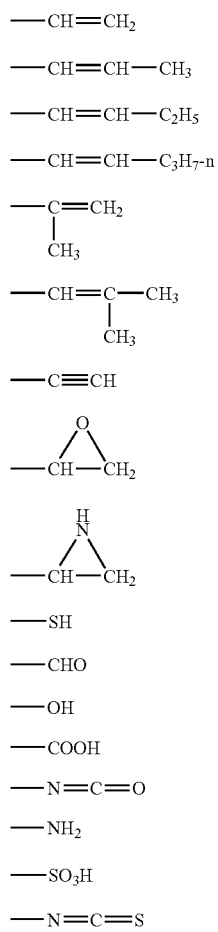

In the formula (I-C), L1 and L4 each independently represents a divalent linking group. L1 and L4 each independently represents preferably a divalent linking group selected from the group consisting of —O—, —S—, —C(=O)—, —NR1—, a divalent chain group, a divalent cyclic group and a combination thereof. R1 above represents an alkyl group containing 1 to 7 carbon atoms or a hydrogen atom.

Of the divalent linking groups comprising the above-described combination, preferred examples are shown below. Here, the left side is connected to Q (Q1 or Q2), and the right side is connected to Cy (Cy1 or Cy3).

L-1: —CO—O-divalent chain group-O—
L-2: —CO—O-divalent chain group-O—CO—
L-3: —CO—O-divalent chain group-O—CO—O—
L-4: —CO—O-divalent chain group-O-divalent cyclic group-
L-5: —CO—O-divalent chain group-O-divalent cyclic group-CO—O—
L-6: —CO—O-divalent chain group-O-divalent cyclic group-O—CO—
L-7: —CO—O-divalent chain group-O-divalent cyclic group-divalent chain group-
L-8: —CO—O-divalent chain group-O-divalent cyclic group-divalent chain group-CO—O—
L-9: —CO—O-divalent chain group-O-divalent cyclic group-divalent chain group-O—CO—
L-10: —CO—O-divalent chain group-O—CO-divalent cyclic group-
L-11: —CO—O-divalent chain group-O—CO-divalent cyclic group-CO—O—
L-12: —CO—O-divalent chain group-O—CO-divalent cyclic group-O—CO—
L-13: —CO—O-divalent chain group-O—CO-divalent cyclic group-divalent chain group-
L-14: —CO—O-divalent chain group-O—CO-divalent cyclic group-divalent chain group-CO—O—
L-15: —CO—O-divalent chain group-O—CO-divalent cyclic group-divalent chain group-O—CO—
L-16: —CO—O-divalent chain group-O—CO—O-divalent cyclic group
L-17: —CO—O-divalent chain group-O—CO—O-divalent cyclic group-CO—O—
L-18: —CO—O-divalent chain group-O—CO—O-divalent cyclic group-O—CO—
L-19: —CO—O-divalent chain group-O—CO—O-divalent cyclic group
L-20: —CO—O-divalent chain group-O—CO—O-divalent cyclic group-divalent chain group-CO—O—
L-21: —CO—O-divalent chain group-O—CO—O-divalent cyclic group-divalent chain group-O—CO—

The divalent chain group means an alkylene group, a substituted alkylene group, an alkenylene group, a substituted alkenylene group, an alkynylene group or a substituted alkynylene group. An alkynene group, a substituted alkylene group, an alkenylene group and a substituted alkenylene group are preferred, with an alkylene group and an alkenylene group being more preferred.

The alkylene group may be branched. The alkylene group has preferably 1 to 12 carbon atoms, more preferably 2 to 10 carbon atoms, most preferably 2 to 8 carbon atoms.

The alkylene moiety of the substituted alkylene group is the same as the alkylene group described above. Examples of the substituent include halogen atoms.

The alkenylene group may be branched. The alkenylene group has preferably 1 to 12 carbon atoms, more preferably 2 to 10 carbon atoms, most preferably 2 to 8 carbon atoms.

The alkenylene moiety of the substituted alkenylene group is the same as the alkenylene group described above. Examples of the substituent include halogen atoms.

The alkynylene group may be branched. The alkynylene group has preferably 1 to 12 carbon atoms, more preferably 2 to 10 carbon atoms, most preferably 2 to 8 carbon atoms.

The alkynylene moiety of the substituted alkynylene group is the same as the alkynylene group described above. Examples of the substituent include halogen atoms.

Specific examples of the divalent chain group include ethylene, trimethylene, propylene, butylenes, 1-methylbutylene, entamethylene, hexamethylene, octamethylene, 2-butenylene and 2-butynylene.

Definition and examples of the divalent cyclic group described above are the same as those for Cy1, Cy2 and Cy3 to be described hereinafter.

R1 is preferably an alkyl group having 1 to 4 carbon atoms, more preferably a methyl group or a hydrogen atom, most preferably a hydrogen atom.

In the formula (I-C), L2 and L3 each independently represents a single bond or a divalent linking group. L2 and L3 each independently represents preferably a divalent linking group selected from the group consisting of —O—, —S—, —CO—, —NR2-, a divalent chain group, a divalent cyclic group and a combination thereof. R2 above represents an alkyl group containing 1 to 7 carbon atoms or a hydrogen atom, and is preferably an alkyl group having 1 to 4 carbon atoms or a hydrogen atom, more preferably a methyl group, an ethyl group or a hydrogen atom, most preferably a hydrogen atom. The divalent chain group and the divalent cyclic group are the same as defined for L1 and L4.

In the formula (I-C), n represents 0, 1 or 2. When n represents 2, two L3s may be the same or different from each other, and two Cy2 may also be the same or different from each other. n represents preferably 1 or 2, more preferably 1.

In the formula (I-C), Cy1, Cy2 and Cy3 each independently represents a divalent cyclic group.

A ring contained in the cyclic group is preferably a 5-, 6- or 7-membered ring, more preferably a 5- or 6-membered ring, most preferably a 6-membered ring. The ring contained in the cyclic group may be a condensed ring, though a non-condensed ring is more preferred than the condensed ring.

The ring contained in the cyclic ring may be any of an aromatic ring, an aliphatic ring and a hetero ring. Examples of the aromatic ring include a benzene ring and a naphthalene ring. Examples of the aliphatic ring include a cyclohexane ring, etc. Examples of the hetero ring include a pyridine ring and a pyrimidine ring.

As a cyclic group containing a benzene ring, 1,4-phenylene is preferred. As a cyclic group containing a naphthalene ring, naphthalene-1,5-diyl and naphthalene-2,6-diyl are preferred. As a cyclic group containing a cyclohexane ring, 1,4-cyclohexylene is preferred. As a cyclic ring containing a pyridine ring, pyridine-2,5-diyl is preferred. As a cyclic ring having a pyrimidine ring, pyrimidine-2,5-diyl is preferred.

The cyclic group may have a substituent. Examples of the substituent include a halogen atom, a cyano group, a nitro group, an alkyl group containing 1 to 5 carbon atoms, a halogen-substituted alkyl group containing 1 to 5 carbon atoms, an alkoxy group containing 1 to 5 carbon atoms, an alkyl thio group containing 1 to 5 carbon atoms, an acyloxy group containing 2 to 6 carbon atoms, an alkoxycarbonyl group containing 2 to 6 carbon atoms, a carbamoyl group, a carbamoyl group substituted by an alkyl group containing 2 to 6 carbon atoms, and an acylamino group containing 2 to 6 carbon atoms.

Examples of the rod-like polymerizable liquid crystal compound represented by the formula (I-C) are shown below which, however, are not construed to be limitative of the invention.

I-1)

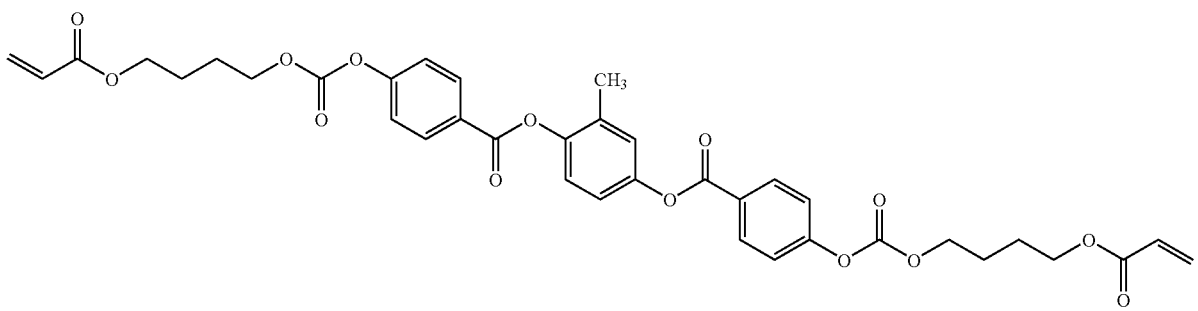

I-2)

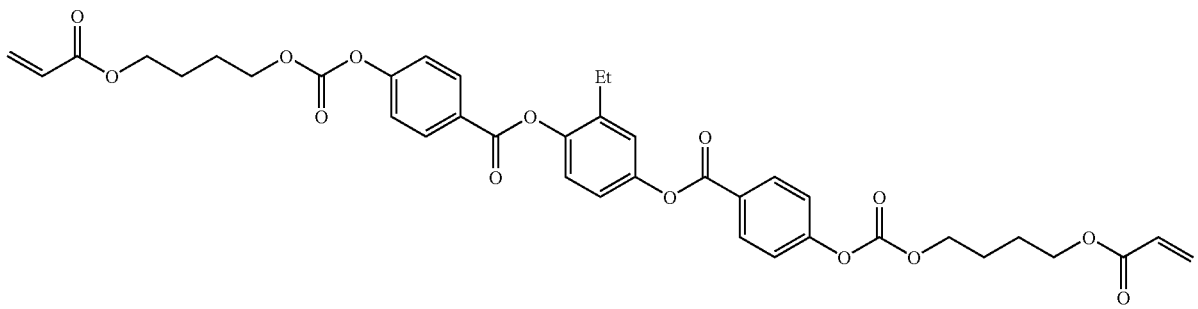

I-3)
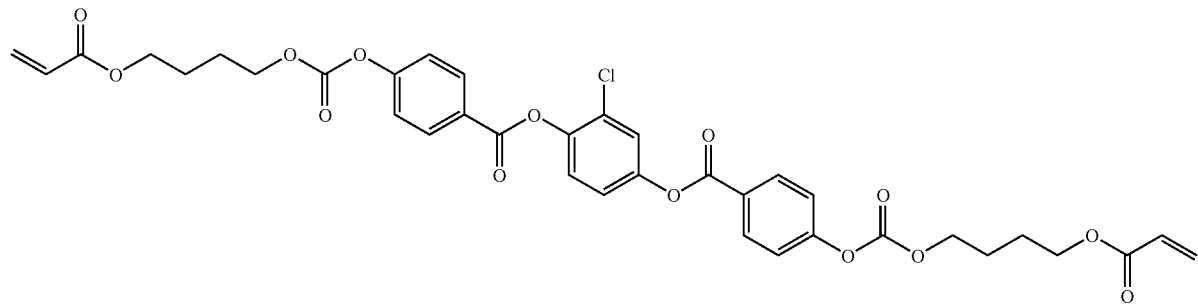
I-4)
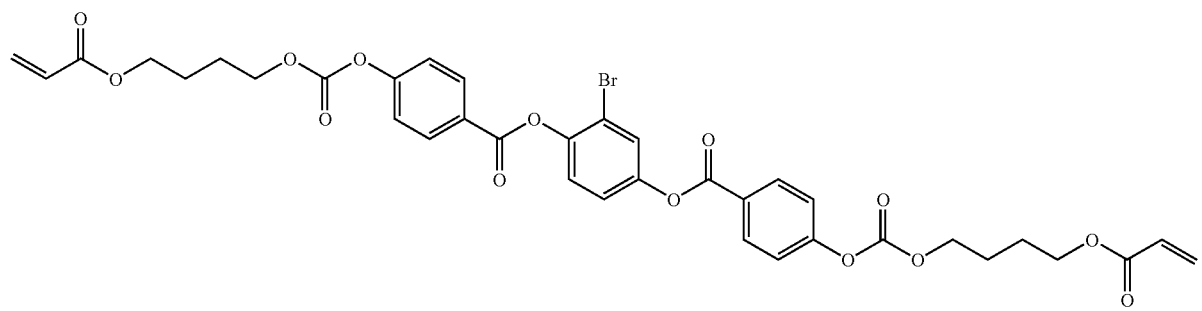
I-5)
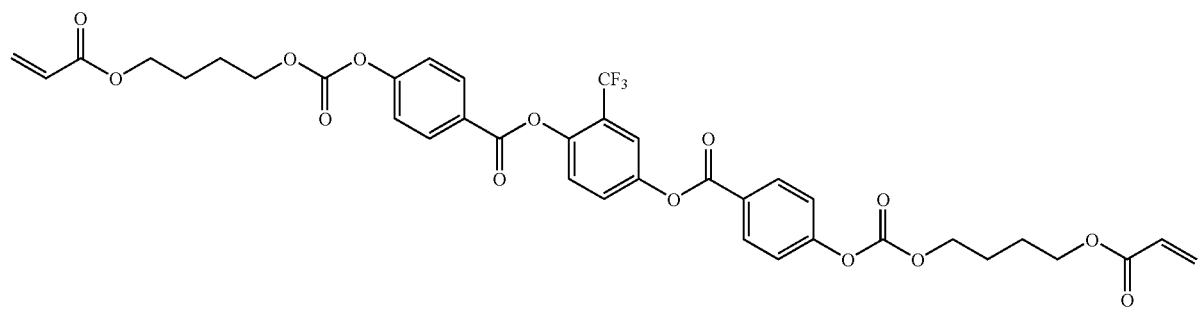
I-6)
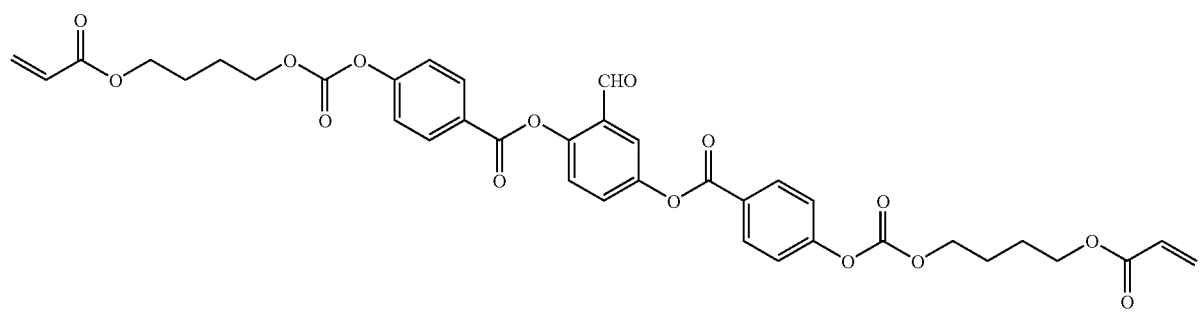

I-7)
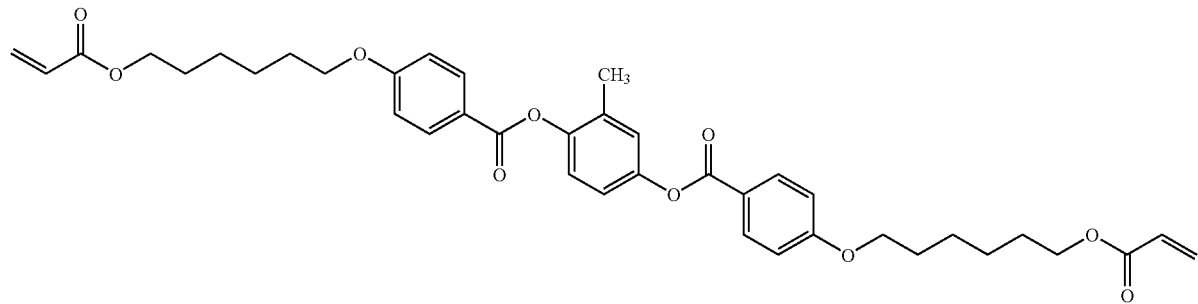
I-8)
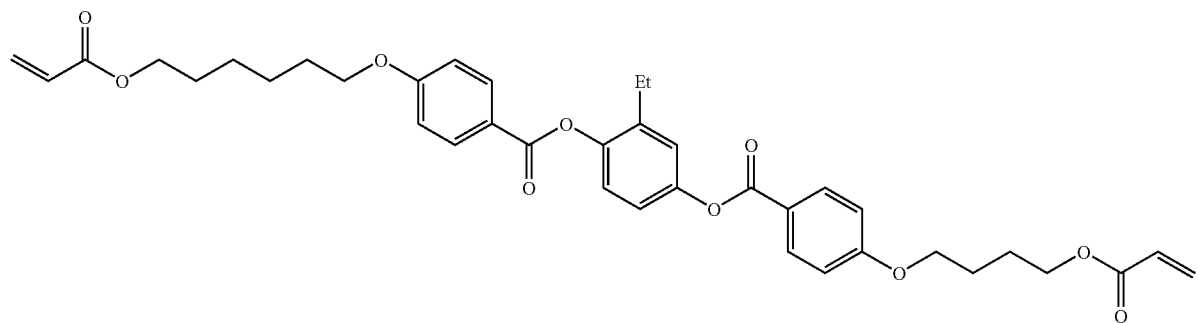
I-9)
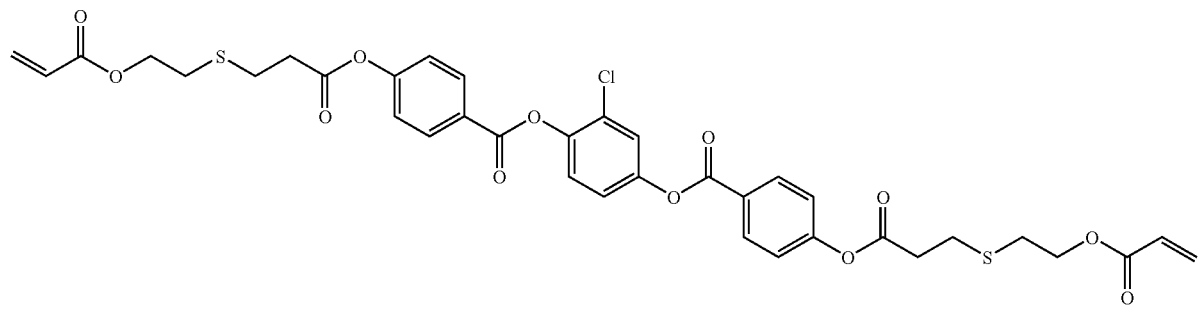
I-10)
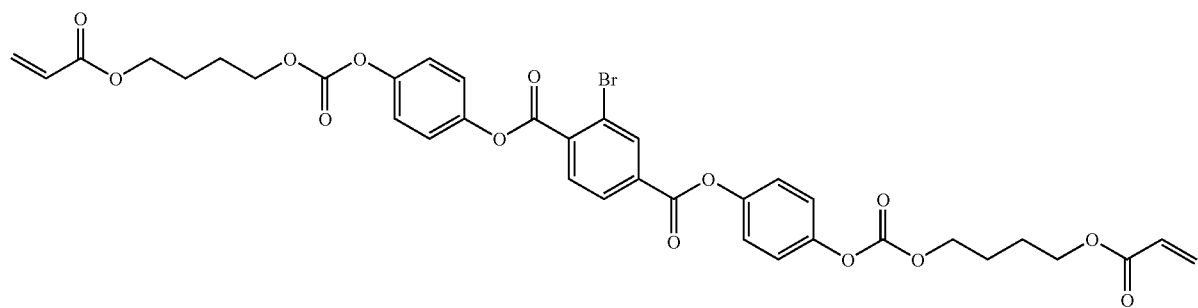

-continued
I-11)
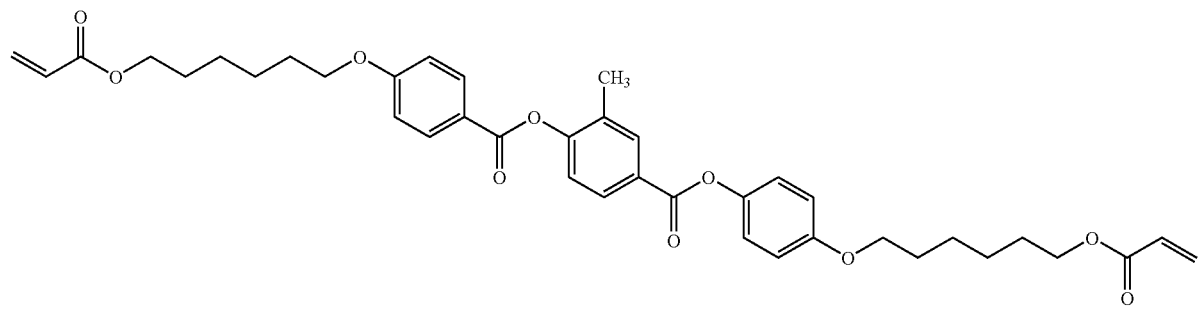
I-12)
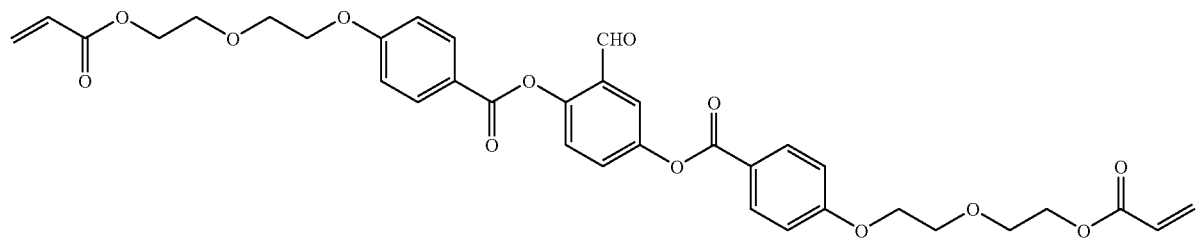
I-13)
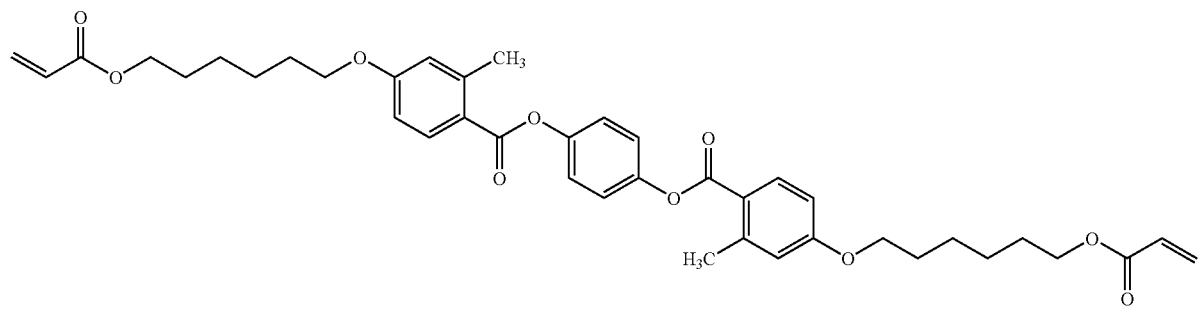
I-14)
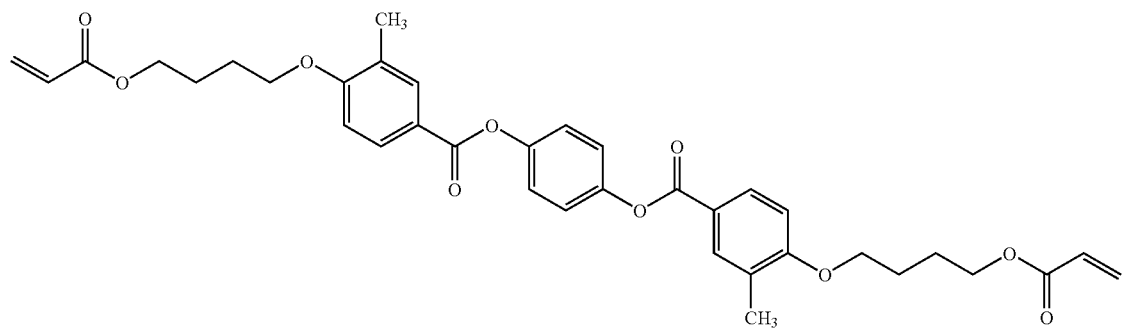
I-15)
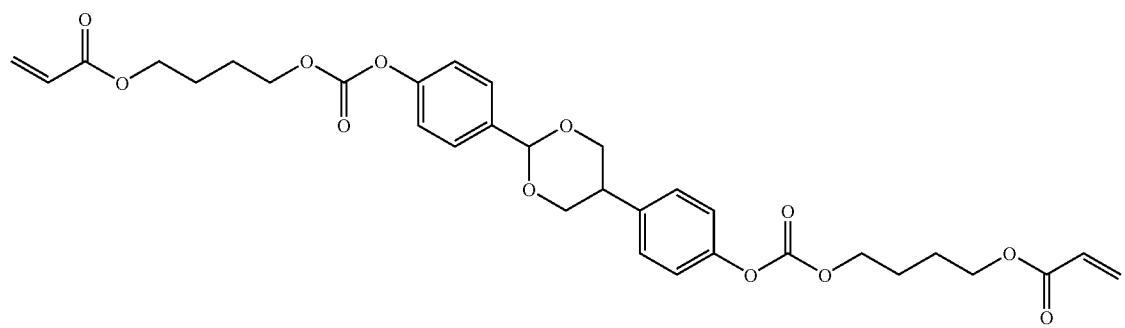

-continued
I-16)
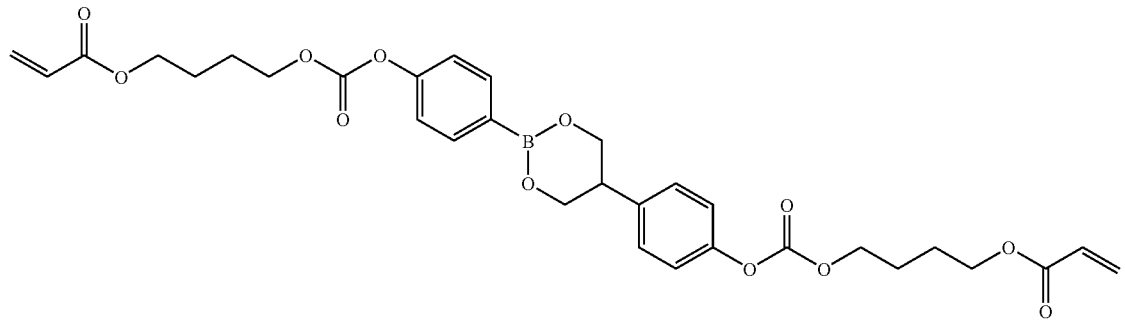
I-17)
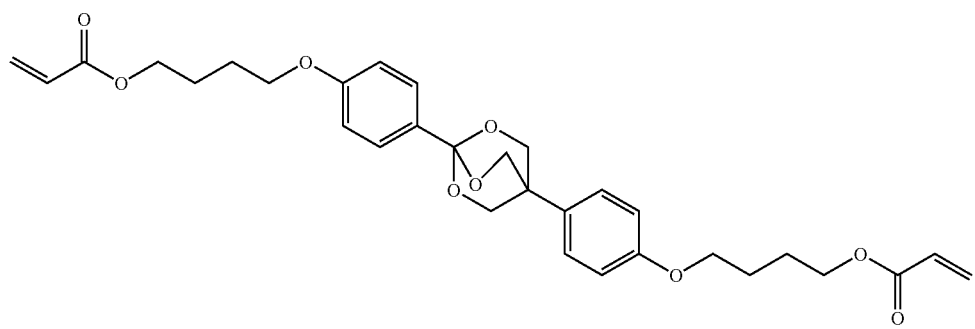
I-18)
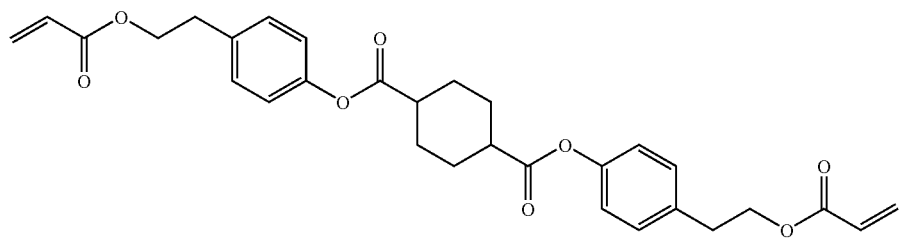
I-19)
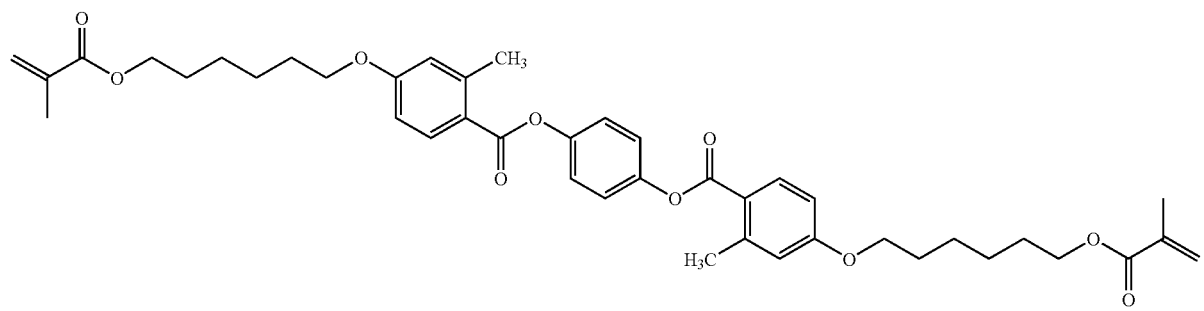

I-20)
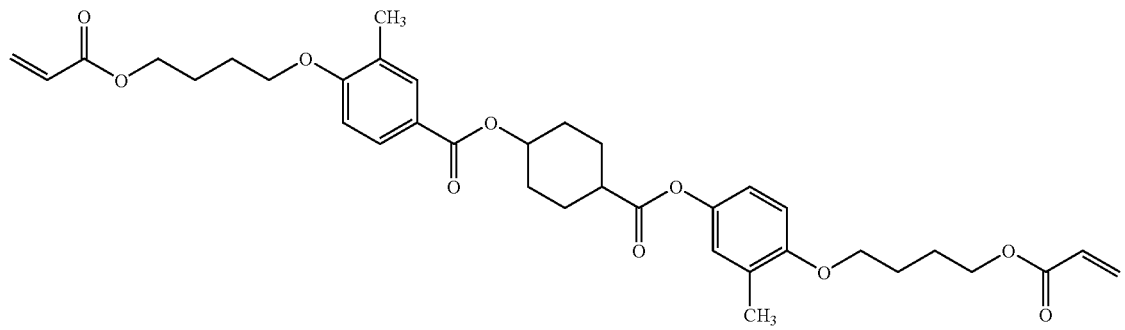
I-21)
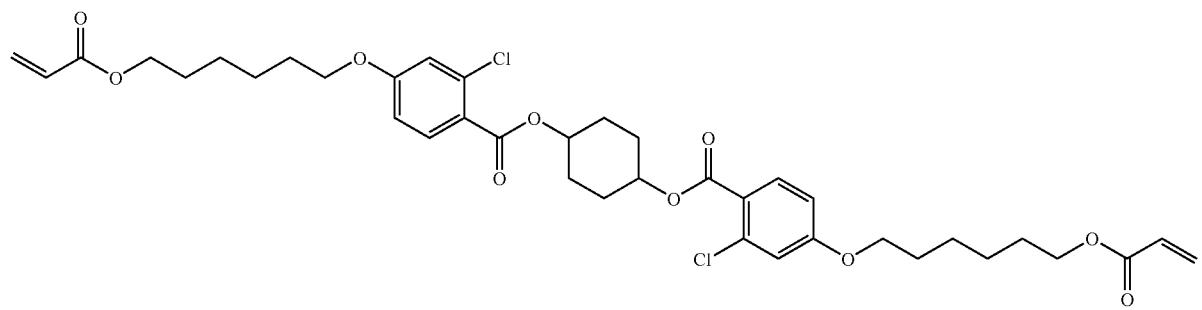
I-22)
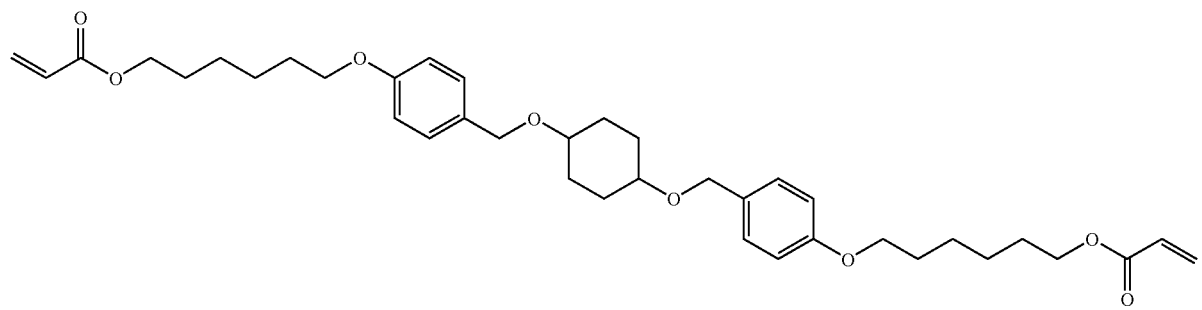
I-23)
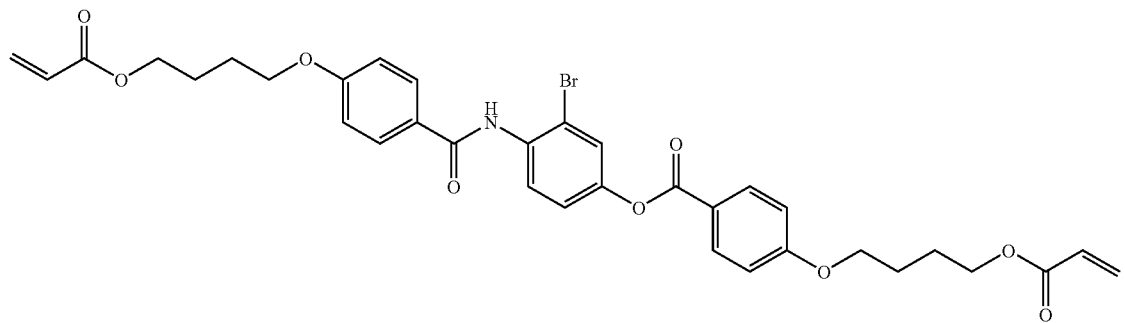

I-24)

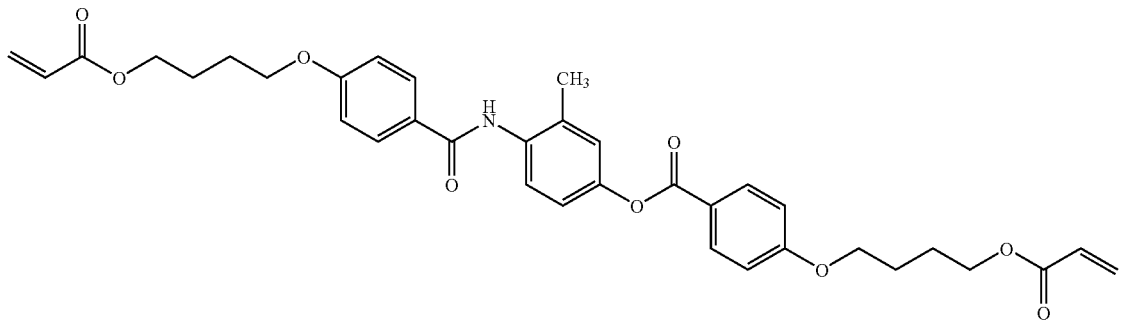

The refractive index-controlling agent satisfying the above formula (II) is preferably a compound having a disc-like shape. The compound having a disc-like shape is a compound having a disc-like molecular structure wherein an aromatic ring or an aliphatic ring forms a core, and may be a compound prepared by introducing a substituent into a disc-like molecule or, further, may be a compound prepared by replacing the side chain moiety of a disc-like compound by other substituent. Examples of such substituent are same as the listed substituents as Group A above. Those substituents may further be substituted by those substituents listed as Group A. In the case where two or more substituents exist, they may be the same or different from each other and, if possible, may be connected to each other to form a ring.

Also, the side chain moiety of the disc-like molecule is a substituent bound to the aromatic ring or the aliphatic ring, and such substitutent are same as the listed substituents as Group B above.

The refractive index-controlling agent is preferably a compound having a disc-like shape and being capable of developing a liquid crystal phase, i.e., a discotic liquid crystal compound.

As the discotic liquid crystal compound, there may be used those compounds which are described in various literatures (C. Destrade et al., *Mol. Cryst. Liq. Cryst.*, Vol. 71, page 111 (1981); *Kikan Kagaku Sosetsu*, No. 22, Ekisho No Kagaku, chapter 5, chapter 10, section 2 (compiled by Nihon Kagaku Kai and published in 1994); B. Kohne et al., *Angew. Chem. Soc. Chem. Comm.*, page 1794 (1985); J. Zhanget et al., *J. Am. Chem. Soc.*, vol. 116, page 2655 (1994)).

As the liquid crystal phase which the discotic liquid crystal compound develops, there are illustrated a columnar phase, a columnar nematic phase and a discotic nematic phase. Of these, a discotic nematic phase is particularly preferred.

The refractive index-controlling agent preferably has a polymerizable group for fixing alignment of the liquid crystal compound and, particularly, is a discotic liquid crystal compound having a polymerizable group. Particularly preferably, the refractive index-controlling agent is a compound represented by the following formula (I-D):

D(-L-Q)$_n$      Formula (I-D)

In the formula (I-D), D represents a disc-like core, L represents a divalent linking group, Q represents a polymerizable group, and n represents an integer of 4 to 12.

Examples of the disc-like core in the formula (I-D) are shown below. In the following examples, LQ (or QL) means a combination of the divalent linking group (L) and the polymerizable group (Q).

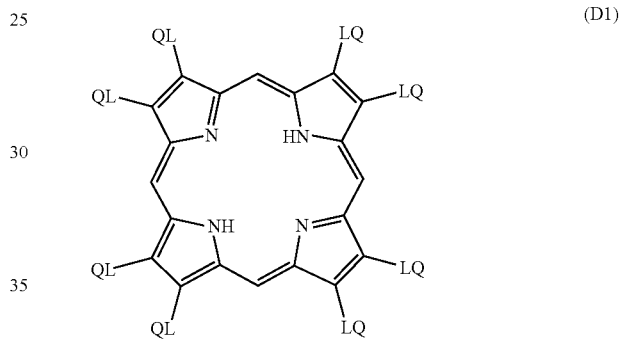
(D1)

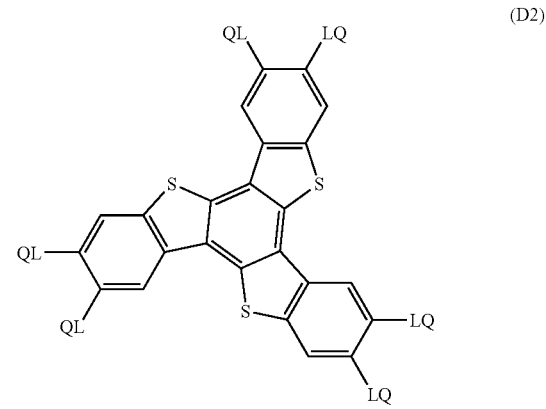
(D2)

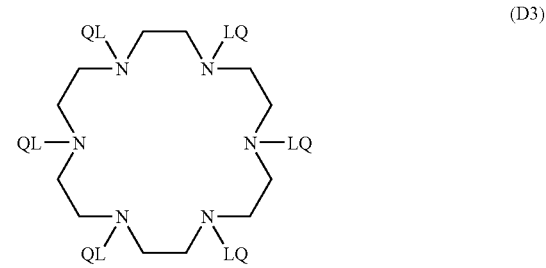
(D3)

-continued
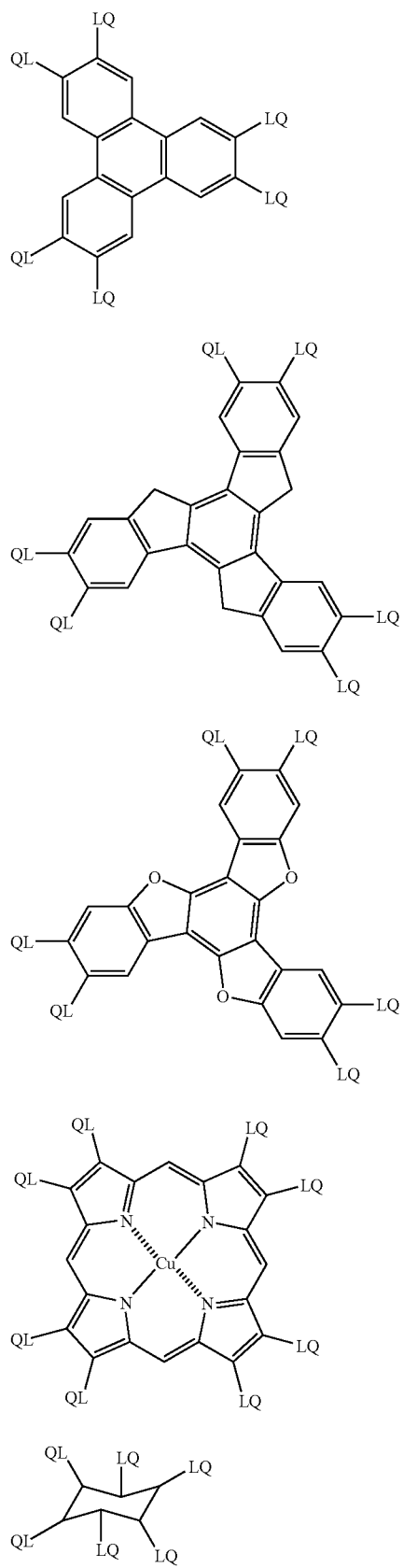
(D4)
(D5)
(D6)
(D7)
(D8)
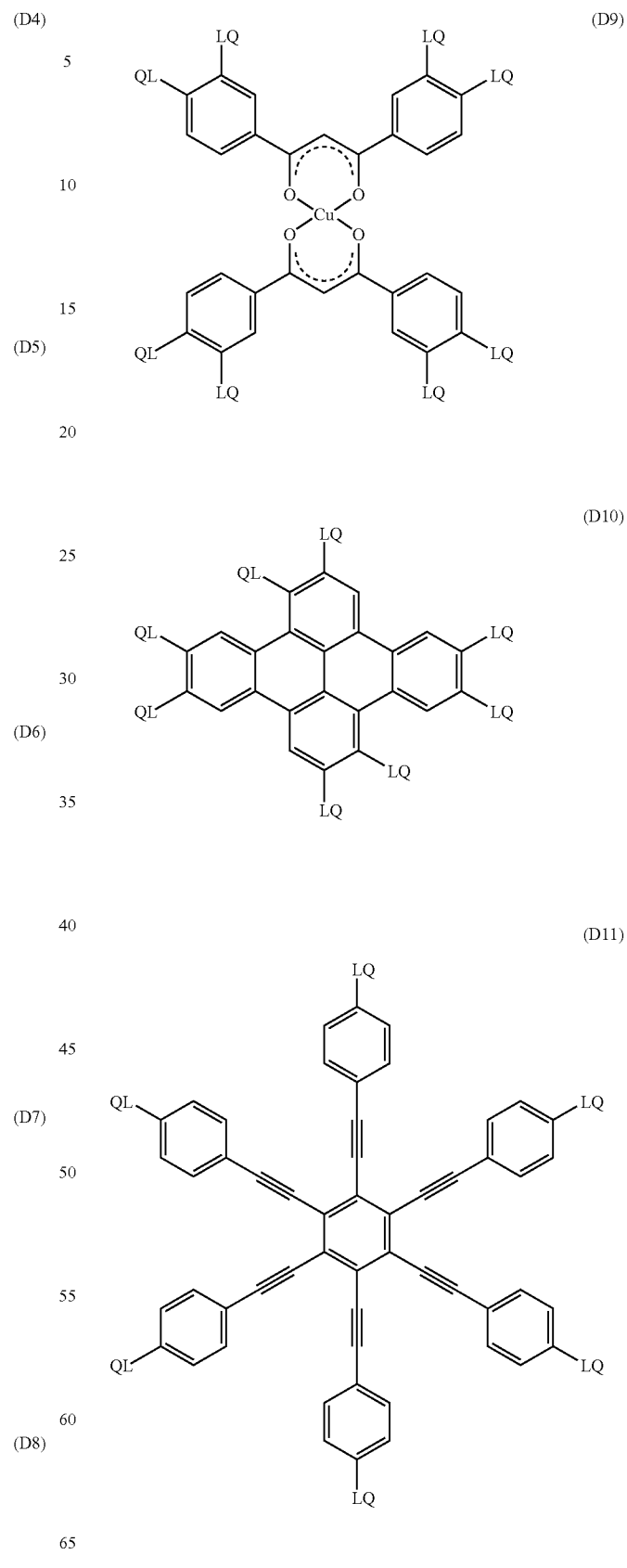
(D9)
(D10)
(D11)

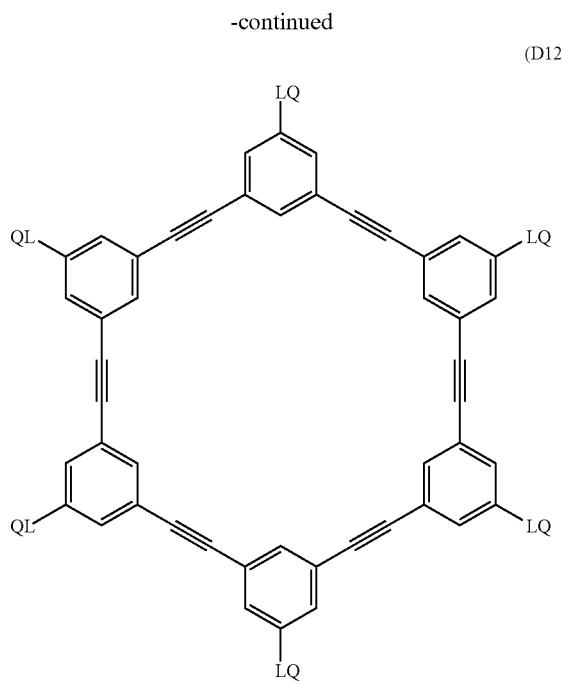

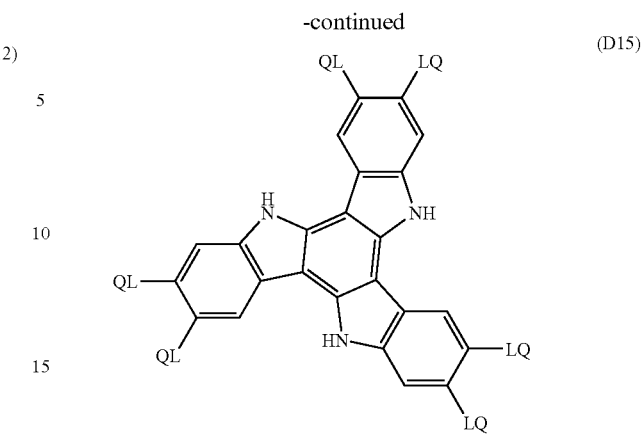

In the formula (I-D), the divalent linking group (L) is preferably a divalent linking group selected from the group consisting of an alkylene group, an alkenylene group, an arylene group, —C(=O)—, —NH—, —O—, —S— and a combination thereof. The divalent linking group (L) is more preferably a divalent group formed by combining at least two of the divalent linking groups selected from the group consisting of an alkylene group, an alkenylene group, an arylene group, —C(=O)—, —NH—, —O— and —S—. The divalent linking group (L) is most preferably a divalent group formed by combining at least two of the divalent linking groups selected from the group consisting of an alkylene group, an alkenylene group, an arylene group, —C(=O)— and —O—.

Here, the alkylene group has preferably 1 to 12 carbon atoms. The alkenylene group has preferably 2 to 12 carbon atoms. The arylene group has preferably 6 to 10 carbon atoms. The alkylene group, the alkenylene group and the arylene group may have a substituent (e.g., an alkyl group, a halogen atom, a cyano group, an alkoxy group or an acyloxy group).

The divalent linking group (L) is exemplified below. The left side is bound to the disc-like core (D), and the right side is bound to the polymerizable group (Q). AL represents an alkylene group or an alkenylene group, and AR represents an arylene group.

L1: -AL-C(=O)—O-AL-
L2: -AL-C(=O)—O-AL-O—
L3: -AL-C(=O)—O-AL-O-AL-
L4: -AL-C(=O)—O-AL-O—C(=O)—
L5: —C(=O)-AR-O-AL-
L6: —C(=O)-AR-O-AL-O—
L7: —C(=O)-AR-O-AL-O—C(=O)—
L8: —C(=O)—NH-AL-
L9: —NH-AL-O—
L10: —NH-AL-O—C(=O)—
L11: —O-AL-
L12: —O-AL-O—
L13: —O-AL-O—C(=O)—
L14: —O-AL-O—C(=O)—NH-AL-
L15: —O-AL-S-AL-
L16: —O—C(=O)-AL-AR-O-AL-O—C(=O)—
L17: —O—C(=O)-AR-O-AL-C(=O)—
L18: —O—C(=O)-AR-O-AL-O—C(=O)—
L19: —O—C(=O)-AR-O-AL-O-AL-O—C(=O)—
L20: —O—C(=O)-AR-O-AL-O-AL-O-AL-O—C(=O)—
L21: —S-AL-
L22: —S-AL-O—

L23: —S-AL-O—C(=O)—
L24: —S-AL-S-AL-
L25: —S-AR-AL-

The polymerizble group (Q) in the formula (I-D) is not particularly limited and, in the case of polymerizing the biaxial liquid crystal composition of the invention, it can be determined depending upon the kind of polymerization reaction.

Examples of the polymerizable group (Q) are same as the polymerizable groups Q-1 to Q17 listed above as examples of the polymerizable group of the polymerizable rod-like liquid crystal compounds. Especially, the polymerizable group (Q) is preferably an unsaturated polymerizable group (Q1 to Q7), an epoxy group (Q8) or an aziridinyl group (Q9), more preferably an unsaturated polymerizable group, most preferably an ethylenically unsaturated polymerizable group (Q1 to Q6).

In the formula (I-D), n represents an integer of 4 to 12. Specific number is determined depending upon the kind of discotic core (D).

Additionally, in the formula (D), plural combinations of L and Q may be different, but are preferably the same. It is also possible to use two or more kinds of discotic liquid crystal compounds in combination. For example, a molecule having a polymerizable group (Q) and a molecule not having the group may be used in combination.

As the non-polymerizable discotic liquid crystal compound, those compounds are preferred which have a structure formed by replacing the polymerizable group (Q) of the aforementioned polymerizable discotic liquid crystal compound by a hydrogen atom or an alkyl group. That is, the non-polymerizable discotic liquid crystal compound is preferably a compound represented by the following formula:

D(-L-R)$_n$ wherein D represents a disc-like core, L represents a divalent linking group, R represents a hydrogen atom or an alkyl group, and n represents an integer of 4 to 12.

Examples of the disc-like core (D) in the above formula are the same as those referred to with respect to the polymerizable discotic liquid crystal compounds except for replacing LQ (or QL) by LR (or RL). Examples of the divalent linking group (L) are also the same as those referred to with respect to the polymerizable discotic liquid crystal compounds.

The alkyl group represented by R has preferably 1 to 40 carbon atoms, more preferably 1 to 30 carbon atoms. A chain alkyl group is preferred to a cyclic alkyl group, and a straight-chain alkyl group is preferred to a branched alkyl group. R is particularly preferably a hydrogen atom or a straight-chain alkyl group having 1 to 30 carbon atoms.

[Liquid Crystal Composition]

The liquid crystal temperature range of the biaxial liquid crystal composition of the invention is not particularly limited but, in view of application aspect of the liquid crystal composition such as production suitability, it is preferably in a range of from 10 to 250° C., more preferably in a range of from 10 to 150° C. In case where it is less than 10° C., it is sometimes required to provide a cooling step for decreasing the temperature to a level at which the composition forms a liquid crystal phase. Also, in case where it exceeds 200° C., it is required to heat the composition to a higher temperature than the temperature where the composition once forms a liquid crystal phase so as to obtain an isotropic liquid state, thus such composition being disadvantageous due to the waste of heat energy and deformation or change of properties of a substrate.

The biaxial liquid crystal composition of the invention permits fixation without spoiling alignment state in its liquid crystal state by once heating to a temperature at which a liquid crystal phase is formed, then cooling it with maintaining the alignment state.

Also, in the case where at least one of the liquid crystal compound and the refractive index-controlling agent has a polymerizable group, to obtain a polymerization product by adding, if necessary, a polymerization initiator and polymerizing the composition is preferred in view of fixing the alignment state. The polymerization product can be obtained as a polymerization product in which the liquid crystalline biaxial properties are maintained, by heating the composition to a temperature at which it forms a liquid crystal phase, then cooling the composition. The composition can be used as a layer having optically anisotropic properties in various optical films such as a retardation plate.

In the invention, the most typical and preferred embodiment of the state where alignment is fixed is a state where the alignment is maintained. However, the state is not limited only to them and, specifically, it means such state that, under the condition of usually 0 to 50° C., more severely −30 to 70° C., the composition shows no fluidity, does not undergo change in the alignment state when outer field or outer force is applied thereto, and can stably keep the fixed alignment form.

Additionally, when alignment state is finally fixed, the liquid crystal composition of the invention is not required to show liquid crystal properties any more. For example, with a low-molecular liquid crystal compound having a group capable of causing reaction when heated or irradiated with light, it may lose the liquid crystal properties after polymerization or cross-linking by heat or light.

[Retardation Plate]

The retardation plate of the invention can be prepared by forming an optically anisotropic layer with the use of the biaxial liquid crystal composition of the invention on an alignment film provided on a transparent support.

Here, the optically anisotropic layer can be obtained by adding, if necessary, other additives to the biaxial liquid crystal composition of the invention, coating the composition on the alignment film, and fixing the alignment of the liquid crystal state in the above-described manner.

The thickness of the optically anisotropic layer formed from the biaxial liquid crystal composition is preferably 0.1 to 20 μm, more preferably 0.5 to 15 μm, most preferably 1 to 10 μm.

In case the optically anisotropic layer is formed, a weight ratio of a liquid crystal compound to a refractive index-controlling agent in the biaxial liquid crystal composition preferably from 1:2 to 100:1, and more preferably, from 2:1 to 20:1.

[Additives for the Optically Anisotropic Layer]

As examples of the additives to be added to the biaxial liquid crystal composition upon formation of the optically anisotropic layer, there are illustrated air interface alignment-controlling agents, cissing-preventing agents, polymerization initiators and polymerizable monomers.

[Air Interface Alignment-Controlling Agent]

The liquid crystal compound is aligned at an air interface pretilt angle at the interface with air. With the pretilt angle, there are three kinds: a pretilt angle between nx refractive index direction and the air interface; a pretilt angle between ny refractive index direction and the air interface; and a pretilt angle between nz refractrive index direction and the air interface. The pretilt angle varies depending upon kind of the compound, and hence it is necessary to arbitrarily control the air interface pretilt angle according to the end use.

In order to control the pretilt angle, outer fields such as an electric field and a magnetic field or additives may be used, with the use of additives being preferred.

As such additives, compounds having within the molecule one or more substituted or unsubstituted aliphatic group shaving 6 to 40 carbon atoms or one or more oligosiloxanoxy groups substituted by a substituted or unsubstituted aliphatic group having 6 to 40 carbon atoms are preferred, with compounds having two or more such groups being more preferred.

The amount of the alignment-controlling agent on the air interface side to the liquid crystal compound is preferably 0.001% by weight to 20% by weight, more preferably 0.01% by weight to 10% by weight, most preferably 0.1% by weight to 5% by weight.

[Cissing-preventing Agent]

As a material to be added to the biaxial liquid crystal composition for preventing cissing upon coating the composition, a high-molecular compound is generally used.

Such polymer is not particularly limited so long as it does not seriously inhibit the change in inclined angle or the alignment of the liquid crystal compound.

Examples of the polymer are given in JP-A-8-95030 and, as particularly preferred specific polymer examples, there are illustrated cellulose esters. Examples of the cellulose esters include cellulose acetate, cellulose acetate propionate, hydroxypropyl cellulose and cellulose acetate butyrate. In order not to inhibit alignment of the compound showing biaxial liquid crystal properties, the amount of the polymer to be used for the purpose of preventing cissing to the liquid crystal compound is generally in a range of from 0.1 to 10% by weight, more preferably in a range of from 0.1 to 8% by weight, still more preferably from 0.1 to 5% by weight.

[Polymerization Initiator]

In the invention, the liquid crystal compound is fixed preferably in a monodomain alignment, i.e., in a substantially uniformly aligned state. Therefore, in the case of using a polymerizable liquid crystal compound, it is preferred to fix the liquid crystal compound by polymerization reaction.

The polymerization reaction includes a thermal polymerization reaction using a thermal polymerization initiator, a photo polymerization reaction using a photo polymerization initiator, and a polymerization reaction by irradiation with electron beam. In order to prevent deformation and changes of properties of the support due to heat, photo polymerization reaction and polymerization by irradiation with electron beam are preferred Examples of the photo polymerization initiator include α-carbonyl compounds (described in U.S. Pat. Nos. 2,367,661 and 2,367,670), acyloin ether (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), a combination of a triarylimidazole dimmer and a p-aminophenylketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The amount of the photo polymerization initiator is preferably 0.01 to 20% by weight, more preferably 0.5 to 5% by weight, based on the weight of solid components of a coating solution for forming the optically anisotropic layer.

Light to be used for irradiation to cause polymerization is preferably UV rays. The irradiation energy is preferably 10 mJ to 50 J/cm$^2$, more preferably 50 mJ to 800 mJ/cm$^2$. In order to accelerate the photo polymerization reaction, irradiation with light may be conducted under heating. Also, since the oxygen concentration in the atmosphere influences polymerization degree, it is preferred to reduce oxygen concentration by a method of, for example, displacing the atmosphere by nitrogen in the case where the polymerization degree does not reach a desired level in the air. The oxygen concentration is preferably 10% or less, more preferably 7% or less, most preferably 3% or less.

[Polymerizable Monomer]

The polymerizable monomers to be used in the invention are not particularly limited so long as they have a proper compatibility with the liquid crystal compound and do not cause serious change in inclined angles or alignment of the liquid crystal compound. Of these, compounds having a polymerization-active ethylenically unsaturated group such as a vinyl group, a vinyloxy group, an acryloyl group or a methoacryloyl group are preferably used.

The amount of the polymerizable monomer is in a range of generally from 0.5 to 50% by weight, preferably from 1 to 30% by weight, based on the liquid crystal compound. Also, use of a monomer having two or more reactive functional groups is particularly preferred because an effect of enhancing adhesion between the alignment film and the optically anisotropic layer is expected.

[Coating Solvent]

As solvents to be used for preparing the biaxial liquid crystal composition, organic solvents are favorably used. Examples of the organic solvent include amides (e.g., N,N-dimethylformamide), sulfoxides (e.g., dimethylsulfoxaide), hetero ring compounds (e.g., pyridine), hydrocarbons (e.g., toluene and hexane), alkylhalides (e.g., chloroform and dichloromethane), esters (e.g., methyl acetate and butyl acetate), ketones (e.g., acetone, methyl ethyl ketone, methyl isobutyl ketone and cyclohexanone), ethers (e.g., tetrahydrofuran and 1,2-dimethoxyethane). It is also possible to use two or more of the organic solvents in combination.

[Coating Method]

The optically anisotropic layer is formed by preparing a coating solution of the biaxial liquid crystal composition using the above-described solvent, and coating it on an alignment film to attain alignment of the biaxial liquid crystal composition. Coating of the coating solution can be conducted according to a known method (e.g., a wire bar coating method, an extrusion coating method, a direct gravure coating method, a reverse gravure coating method or a die coating method).

[Alignment Film]

The alignment film can be formed by rubbing treatment of an organic compound (preferably a polymer), oblique evaporation of an inorganic compound, formation of a microgroove layer, or accumulation of an organic compound (e.g., ω-tricosanoic acid or methyl stearate) according to a Langmuir-Blodgett method (LB membrane). Further, there are known alignment films whose aligning function can be activated by applying an electric or magnetic field to the film or by irradiating the film with light.

The alignment film may be any film that can impart a desired alignment to the liquid crystal compound of the optically anisotropic layer to be provided on the alignment film. In the invention, however, the alignment film is preferably formed by rubbing a polymer. Rubbing treatment can generally be conducted by rubbing the surface of a polymer layer several times in a definite direction with paper or cloth. In the invention, it is particularly preferred to conduct the rubbing treatment according to the method described in *Ekisho Binran* (Maruzen K. K.). The thickness of the alignment film is preferably 0.01 to 10 μm, more preferably 0.05 to 3 μm.

The polymer to be used for the alignment film is described in many literatures, and there are many commercially available products. Polyvinyl alcohol and its derivatives are preferably used. A denatured polyvinyl alcohol having a hydrophobic group is particularly preferred. As the alignment film, an alignment film used for a discotic liquid crystal may be used as an alignment film for the biaxial liquid crystal. As to such alignment film, reference may be made to the description in WO01/88574A1, p. 43, line 24 to p. 49, line 8.

[Rubbing Density of Alignment Film]

Between rubbing density of alignment film and pretilt angle of a liquid crystal compound at the interface with the alignment film exists a relation that, when the rubbing density is increased, there results a decreased pretilt angle whereas, when the rubbing density is decreased, there results an increased pretilt angle. Thus, the pretilt angle can be adjusted by changing the rubbing density of the alignment film.

As a method for changing the rubbing density of the alignment film, there may be employed a method described in *Ekisho Binran* (Maruzen K. K.). The rubbing density (L) is determined by the following formula (A):

$$L = Nl(1 + 2\pi r n / 60v) \qquad \text{Formula (A)}$$

In the formula (A), N represents a rubbing number, 1 represents a length of a rubbing roller, r represents a radius of the roller, n represents a rotation number (rpm), and v represents a stage-migrating speed (per second).

In order to increase the rubbing density, it suffices to increase the rubbing number, lengthen the contact length of the rubbing roller, enlarge the radius of the roller, increase the rotation number or slow down the stage-migrating speed whereas, in order to decrease the rubbing density, it suffices to conduct reverse procedure.

[Transparent Support]

The transparent support of the retardation plate of the invention is not particularly limited as to material so long as it is optically isotropic and has a light transmittance of 80% or more, but, a polymer film is preferred.

As specific examples of the polymer film, there may be illustrated a film of a cellulose ester (e.g., cellulose diacetate or cellulose triacetate), a norbornene series polymer or a poly(meth)acrylate. Many commercially available ones may favorably be used. Of these, cellulose esters are preferred in view of optical performance, with lower fatty acid esters of cellulose being more preferred. The lower fatty acid means a fatty acid having 6 or less carbon atoms, and the number of carbon atom is preferably 2 (cellulose acetate), 3 (cellulose propionate) or 4 (cellulose butyrate). Cellulose triacetate is particularly preferred. It is also possible to use a fixed fatty acid ester such as cellulose acetate propionate or cellulose acetate butyrate. Also, conventionally known polymers which are liable to cause double refraction such as polycarbonate or polysulfone may be used by modifying with the molecule described in WO00/26705 to thereby reduce double refraction-causing properties.

The cellulose ester (particularly cellulose) to be used as a transparent support is described in detail below.

As the cellulose ester, cellulose acetate having an acetylation degree of 55.0 to 62.5% is preferred. In particular, cellulose acetate having an acetylation degree of 57.0 to 62.0% is more preferred. The term "acetylation degree" means the amount of bound acetic acid per unit weight of cellulose. The acetylation degree is measured and calculated according to measurement and calculation prescribed in ASTM D-817-91 (Testing Method on Cellulose Acetate, etc.).

The viscosity-average molecular weight (DP) of the cellulose ester is preferably 250 or more, more preferably 290 or more. Also, the cellulose ester to be used in the invention preferably has a narrow molecular weight distribution in terms of Mw/Mn (Mw: weight-average molecular weight; Mn: number-average molecular weight) measured by gel permeation chromatography. The specific Mw/Mn value is preferably 1.0 to 1.7, more preferably 1.3 to 1.65, most preferably 1.4 to 1.6.

With the cellulose ester, hydroxyl groups at 2-, 3- and 6-positions of cellulose do not uniformly share the total substitution degree each with ⅓ of the total substitution, but the substitution degree of 6-position hydroxyl group tends to be smaller. It is preferred that the substitution degree of 6-position hydroxyl group is larger than that of 2- and 3-position hydroxyl groups. It is preferred that acetyl substitution degree of the 6-position hydroxyl group accounts for 30 to 40% of the total substitution degree, with 31% to 32% being more preferred. The substitution degree of 6-position is preferably 0.88 or more. The 6-position hydroxyl group may be substituted by an acyl group having 3 or more carbon atoms (e.g., propionyl, butyryl, valeroyl, benzoyl or acryloyl) other than the acetyl group. The substitution degree at each position can be determined by NMR. Cellulose esters having a high substitution degree at 6-position hydroxyl group can be synthesized by reference to Synthesis Example 1 described in JP-A-11-5851, paragraphs 0043 to 0044, Synthesis Example 2 described in paragraphs 0048 to 0049, and Synthesis Example 3 described in paragraphs 0051 to 0052.

In order to adjust retardation of the polymer film to be used as a transparent support, particularly a cellulose acetate film, it is possible to use an aromatic compound containing at least two aromatic rings as a retardation-increasing agent. In the case of using such retardation-increasing agent, the retardation-increasing agent is used in an amount of from 0.01 to 20 parts by weight per 100 parts by weight of cellulose acetate. The retardation-increasing agent is used in an amount of preferably 0.05 to 15 parts by weight per 100 parts by weight of cellulose acetate, more preferably 0.1 to 10 parts by weight. Two or more of the aromatic compounds may be used in combination of them.

The aromatic ring of the aromatic compound includes an aromatic hetero ring as well as an aromatic hydrocarbon ring.

The aromatic hydrocarbon ring is particularly preferably a 6-membered ring (i.e., benzene ring).

The aromatic hetero ring is generally an unsaturated hetero ring. The aromatic hetero ring is preferably a 5-, 6- or 7-membered ring, more preferably a 5- or 6-membered ring. The aromatic hetero ring generally has the maximum number of double bonds. As the hetero atom, nitrogen atom, oxygen atom and sulfur atom are preferred, with nitrogen atom being particularly preferred. Examples of the aromatic hetero ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring are preferred, with a benzene ring and a 1,3,5-triazine ring being more preferred. It is particularly preferred for the aromatic compound to have at least one 1,3,5-triazine ring.

The number of aromatic rings contained in the aromatic compound is preferably 2 to 20, more preferably 2 to 12, still more preferably 2 to 8, most preferably 2 to 6.

Connecting relations between two aromatic rings are classified into: (a) the case of forming a condensed ring; (b) the case of the rings being connected to each other through a single bond; and (c) the case of the rings being connected to each other through a linking group (spiro connection not being formed due to aromatic ring). The connecting relation may be any of (a) to (c). Such retardation-increasing agents are described in, for example, WO01/88574A1, WO00/2619A1, JP-A-2000-111914, JP-A-2000-275434 and JP-A-2002-363343.

The cellulose acetate film is preferably produced by a solvent-casting process from a prepared cellulose acetate solution (dope). To the dope may be added the retardation-increasing agent.

The dope is cast onto a drum or a band to evaporate the solvent and form a film. The dope before casting is preferably adjusted so that the solid content becomes 18 to 35%. The surface of the drum or band is preferably finished in a mirror state. As to casting and drying method in the solvent-casting process, descriptions are made in U.S. Pat. Nos. 2,336,310, 2,367,603, 2,492,078, 2,492,977, 2,492,978, 2,607,704, 2,739,069, 2,739,070, British Patent Nos. 640731, 736892, JP-B-45-4554, JP-B-49-5614, JP-A-60-176834, JP-A-60-203430, and JP-A-62-115035.

The dope is preferably cast on a drum or a band having a surface temperature of 10° C. or less. After casting, it is preferred to apply wind for 2 seconds or longer to dry. It is also possible to strip the thus formed film from the drum or band and dry with a wind having a temperature consecutively changed from 100° C. to 160° C. This method is described in JP-B-5-17844. This method permits to shorten the time of from casting to stripping. In order to conduct this method, it is necessary for the dope to gel at a surface temperature of the drum or the band upon casting.

It is also possible to form a film by casting two or more layers using a prepared cellulose acetate solution (dope). The dope is cast onto a drum or a band to evaporate the solvent and form a film. The dope before casting is preferably adjusted so that the solid content becomes 10 to 40%. The surface of the drum or band is preferably finished in a mirror state.

In the case of casting a plurality of cellulose acetate solutions, the film may be formed by providing a plurality of casting slits in a direction along which the support is conveyed with a space between the slits, and casting the cellulose acetate-containing solutions through respective casting slits to form a laminate film. For example, there may be employed methods described in JP-A-61-158414, JP-A-1-122419 and JP-A-11-198285. It is also possible to form a film by casting a cellulose acetate solution through two casting slits. For example, there may be employed methods described in JP-B-60-27562, JP-A-61-94724, JP-A-61-947245, JP-A-61-104813, JP-A-61-158413and JP-A-6-134933. Also, there may be employed a method of casting for forming a cellulose acetate film by enclosing a flow of a high-density cellulose acetate solution with a low-density cellulose acetate solution and co-extruding both the high-viscosity cellulose acetate solution and the low-viscosity cellulose acetate solution as described in JP-A-56-162617.

Retardation of the cellulose acetate film may be adjusted by stretching treatment. The draw ratio is preferably in a range of from 0 to 100%. In the case of stretching the cellulose acetate film of the invention, tenter stretching is preferably employed. In order to control the slow axis with a high accuracy, it is preferred that difference between the left side and the right side in tenter clipping speed and releasing timing should be minimized.

To the cellulose ester film may be added a plasticizer in order to improve mechanical properties or accelerate drying speed. As such plasticizer, phosphoric acid esters or carboxylic acid esters are used. Examples of the phosophoric acid esters include triphenyl phosphate (TPP) and tricresyl phosphate (TCP). Typical examples of the carboxylic acid esters are phthalates and citrates. Examples of the phthalates include dimethyl phthalate (DMP), diethyl phthalate (DEP), dibutyl phthalate (DBP), dioctyl phthalate (DOP), diphenyl phthalate (DPP) and di-2-ethylhexyl phthalate (DEHP). Examples of the citrates include triethyl O-acetylcitrate (OACTE) and tributyl O-acetylcitrate (OACTB). Examples of other carboxylic acid esters include butyl oleate, methyl acetyl ricinoleate, dibutyl sebacate, and various trimellitic acid esters. The phthalic acid ester series plasticizers (DMP, DEP, DBP, DOP, DPP and DEH) are preferably used. DEP and DPP are particularly preferred. The addition amount of the plasticizer is preferably 0.1 to 25% by weight, more preferably 1 to 20% by weight, most preferably 3 to 15%, based on the amount of the cellulose ester.

To the cellulose ester film may be added deterioration-preventing agents (e.g., an antioxidant, a peroxide-decomposing agent, a radical inhibitor, a metal-inactivating agent, an acid capturing agent and an amine) and UV ray-preventing agent. As to the deterioration-preventing agents, descriptions are given in JP-A-3-199201, JP-A-5-197073, JP-A-5-194789, JP-A-5-271471 and JP-A-6-107854. The amount of the deterioration-preventing agent is preferably 0.01 to 1% by weight, more preferably 0.01 to 0.2% by weight, based on the weight of a prepared solution (dope). If the addition amount is less than 0.01% by weight, there results scarce effects of the deterioration-preventing agent. If the addition amount exceeds 1% by weight, bleed-out phenomenon of the deterioration-preventing agent onto the film surface is sometimes observed.

As a particularly preferred example of the deterioration-preventing agent, there is illustrated butylated hydroxytoluene (BHT). As to UV ray-preventing agent, descriptions are found in JP-A-7-11056.

The cellulose acetate film is preferably subjected to surface treatment. Specific examples of the treatment include corona discharge treatment, glow discharge treatment, flame treatment, acid treatment, alkali treatment and UV ray-irradiating treatment. Also, as is described in JP-A-7-333433, it is favorably utilized to provide an undercoat layer.

In view of maintaining flat properties of the film, the temperature of cellulose acetate film in these treatments is preferably kept under Tg (glass transition temperature), specifically 150° C. or lower than that.

In view of adhesion properties to an alignment film or the like, it is particularly preferred to conduct acid treatment or alkali treatment, i.e., saponification treatment of cellulose acetate.

The alkali saponification treatment is specifically described below.

The alkali saponification treatment is conducted preferably by a cycle of dipping the film surface in an alkali solution, neutralizing in an acidic solution, washing with water, and drying. As the alkali solution, there are illustrated a solution of potassium hydroxide and a solution of sodium hydroxide. The equivalent concentration of the hydroxide ion is in a range of preferably 0.1 to 3.0 N, more preferably 0.5 to 2.0 N. The temperature of the alkali solution is in a range of preferably room temperature to 90° C., more preferably 40 to 70° C.

The surface energy of the cellulose acetate film is preferably 55 mN/m or more, preferably in a range of 60 to 75 mN/m.

The thickness of the cellulose acetate film is usually in a range of 5 to 500 μm, preferably in a range of 20 to 250 μm, more preferably in a range of 30 to 180 μm, particularly preferably in a range of 30 to 110 μm.

[Use of the Retardation Plate]

The retardation plate of the invention can be used in combination with a polarizing film to form an ellipsoidally polarizing plate. Further, it contributes to enlarge the viewing angle by applying to a transmission type liquid crystal display device in combination with a polarizing film.

The ellipsoidally polarizing plate and the liquid crystal display device utilizing the retardation plate of the invention are described below.

[Ellipsoidally Polarizing Plate]

The ellipsoidally polarizing plate can be prepared by laminating the retardation plate of the invention and a polarizing film. An ellipsoidally polarizing plate capable of enlarging the viewing angle of a liquid display device can be provided by utilizing the retardation plate of the invention.

As the polarizing film, there are illustrated an iodine series polarizing film, a dye series polarizing film using a dichroic dye and a polyene series polarizing film. The iodine series polarizing film and the dye series polarizing film are generally produced by using a polyvinyl alcohol series film. The polarizing axis of the polarizing film corresponds to the direction vertical to the stretching direction of the film.

The polarizing film is laminated on the optically anisotropic layer side of the retardation plate. It is preferred to form a transparent protective membrane on the opposite side of the polarizing film to the side on which the retardation plate is laminated. The transparent protective membrane has a light transmittance of preferably 80% or more. As the transparent protective membrane, a cellulose ester film is generally used, with a triacetyl cellulose film being preferred. The cellulose ester film is preferably formed by the solvent-casting method. The thickness of the transparent protective membrane is preferably 20 to 500 μm, more preferably 50 to 200 μm.

[Liquid Crystal Display Device]

A liquid crystal display device having the enlarged viewing angle can be provided by utilizing the retardation plate of the invention. A retardation plate for TN mode liquid crystal cell (optically compensatory sheet) is described in JP-A-6-214116, U.S. Pat. Nos. 5,583,679, 5,646,703 and German Patent No. 3,911,620A1. An optically compensatory sheet for IPS mode or FLC mode liquid crystal cell is described in JP-A-10-54982. Further, an optically compensatory sheet for OCB mode or HAN mode liquid crystal cell is described in U.S. Pat. No. 5,805,253 and WO96/37804. Still further, an optically compensatory sheet for STN mode liquid crystal cell is described in JP-A-9-26572, and an optical compensatory sheet for VA mode liquid crystal cell is described in Japanese Patent No. 2,866,372.

In the invention, retardation plates (optically compensatory sheets) for liquid crystal cells of various modes can be prepared by reference to the above-mentioned publication. The retardation plate of the invention can be used for liquid crystal display devices of various display modes such as TN (Twisted Nematic) mode, IPS (In-Plane Switching) mode, FLC (Ferroelectric Liquid Crystal) mode, OCB (Optically Compensatory Bend) mode, STN (Super Twisted Nematic) mode, VA (Vertically Aligned) Mode and HAN (Hybrid Aligned Nematic) Mode.

A liquid crystal display device comprises a liquid crystal cell, a polarizing element and a retardation plate (optically compensatory sheet). The polarizing element generally comprises a polarizing film and a protective membrane. As the polarizing film and the protective membrane, those described with respect to the ellipsoidally polarizing plate may be used.

EXAMPLES

The invention is described by reference to Examples below which, however, are not to be construed as limiting the invention.

Example 1

Effect of the Refractive Index-controlling Agent Satisfying the Above Formula (I)

[Preparation of a Liquid Crystal Composition]

1 g of the biaxial liquid crystal compound (m-3) and 0.2 g of the refractive index-controlling agent (I-1) are dissolved in acetone, followed by removing acetone under reduced pressure to obtain a biaxial liquid crystal composition.

(Confirmation of Biaxial Properties)

This biaxial liquid crystal composition is placed in an orientation cell wherein rubbing directions are anti-parallel, and conoscope observation is conducted under a polarizing microscope at a liquid crystal temperature. Also, only the biaxial liquid crystal compound (m-3) is placed in an orientation cell wherein rubbing directions are anti-parallel, and conoscope observation is conducted under a polarizing microscope. Comparison of the patterns obtained from both of them reveals that they are different in biaxial properties and that the relation therebetween is $(nx-ny)/(ny-nz) > (nx0-ny0)/(ny0-nz0)$.

Example 2

Preparation of Retardation Plate (Preparation of Transparent Support)

The following ingredients were thrown into a mixing tank, followed by heating under stirring to prepare a cellulose acetate solution (dope).

(Formulation of cellulose acetate solution)

| | |
|---|---|
| Cellulose acetate of 60.9% in acetylation degree | 100 parts by weight |
| Triphenyl phosphate | 6.5 parts by weight |
| Biphenyldiphenyl phosphate | 5.2 parts by weight |
| Retardation-increasing agent (1) shown below | 0.1 part by weight |
| Retardation-increasing agent (2) shown below | 0.2 part by weight |
| Methylene chloride | 310.25 parts by weight |
| Methanol | 54.75 parts by weight |
| 1-Butanol | 10.95 parts by weight |

Retardation-increasing agent (1)

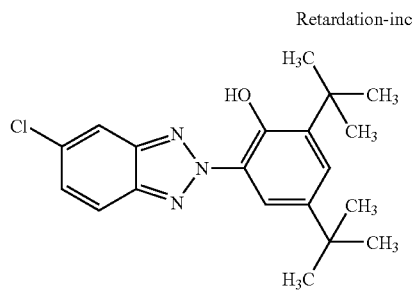

Retardation-increasing agent (2)

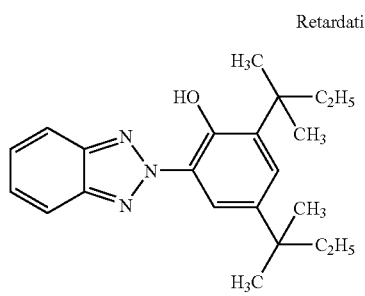

The above-described dope is cast through a casting slit onto a drum cooled to 0° C. The film is stripped from the drum in a state that the solvent content is 70% by weight, and both ends of the film in the width direction are fixed by means of a pin tenter and, in the region of 3 to 5% by weight in the solvent content, the film is dried with keeping the space so that the draw ratio becomes 3% in the width direction (direction vertical to the longitudinal direction). Then, the film is further dried by conveying between rolls of a heat-treating apparatus, and is adjusted at a temperature exceeding 120° C. so that the draw ratio in the longitudinal direction becomes substantially 0% and that the ratio of the draw ratio in the width direction to the draw ratio in the mechanical direction becomes 0.75 (taking into consideration that the film is stretched 4% in the longitudinal direction upon stripping), thus a 100-μm thick cellulose acetate film being prepared. Retardation of the prepared film is measured at a wavelength of 632.8 nm, and retardation in the thickness direction is found to be 40 nm, and in-plane retardation to be 4 nm. The thus-prepared cellulose acetate film is used as a transparent support.

(Formation of the First Undercoat Layer)

The coating solution of the following formulation is coated in an amount of 28 m/m² on the transparent support and dried to form the first undercoat layer.

(Formulation of the coating solution for the first undercoat layer)

| | |
|---|---|
| Gelatin | 5.42 parts by weight |
| Formaldehyde | 1.36 parts by weight |
| Salicylic acid | 1.60 parts by weight |
| Acetone | 391 parts by weight |
| Methanol | 158 parts by weight |
| Methylene chloride | 406 parts by weight |
| Water | 12 parts by weight |

(Formation of the Coating Solution for the Second Undercoat Layer)

A coating solution of the following formulation is coated in an amount of 7 ml/m² on the first undercoat layer, and dried to form the second undercoat layer.

(Formulation of the coating solution for the second undercoat layer)

| | |
|---|---|
| Anionic polymer of the following formula | 0.79 parts by weight |
| Monoethyl citrate | 10.1 parts by weight |
| Acetone | 200 parts by weight |
| Methanol | 877 parts by weight |
| Water | 40.5 parts by weight |

Anionic polymer

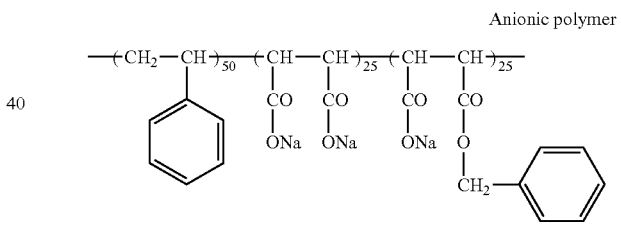

(Formation of the Back Layer)

A coating solution of the following formulation is coated in an amount of 25 ml/M² on the opposite side of the transparent support, and dried to form the back layer.

(Formulation of the coating solution for the back layer)

| | |
|---|---|
| Cellulose diacetate of 55% in acetylation degree | 6.56 parts by weight |
| Silica series matting agent (average particle size: 1 μm) | 0.65 part by weight |
| Acetone | 679 parts by weight |
| Methanol | 104 parts by weight |

(Formation of the Alignment Film)

The following denatured polyvinyl alcohol and glutaraldehyde (5% by weight based on the denatured polyvinyl alcohol) are dissolved in a methanol/water mixed solvent (ratio by volume=20/80) to prepare a 5% by weight solution.

Denatured polyvinyl alcohol

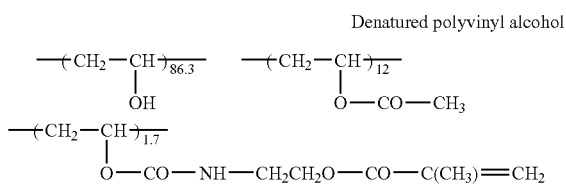

This solution is coated on the second undercoat layer, dried for 120 seconds with a 100° C. hot air, and subjected to rubbing treatment to form the alignment film layer. The thickness of the thus-obtained alignment film layer is 0.5 μm. The direction of rubbing the alignment film is parallel to the direction of casting the transparent support.

(Formation of the Optically Anisotropic Layer)

A coating solution for the optically anisotropic layer having the following formulation is coated on the thus-prepared alignment film having been subjected to the rubbing treatment using a #4 wire bar.

| (Coating solution for the optically anisotropic layer) | |
|---|---|
| Biaxial liquid crystal compound m-3 | 100 parts by weight |
| Refractive index-controlling agent I-1 | 20 parts by weight |
| Air Interface orientation-controlling agent V-(1) shown below | 0.2 parts by weight |
| Photo polymerization initiator HJ-1 shown below | 2.0 parts by weight |
| Lucirin TPO-L (made by BASF) | 2.0 parts by weight |
| Methyl ethyl ketone | 300 parts by weight |

Air interface orientation-controlling agent V-(1)

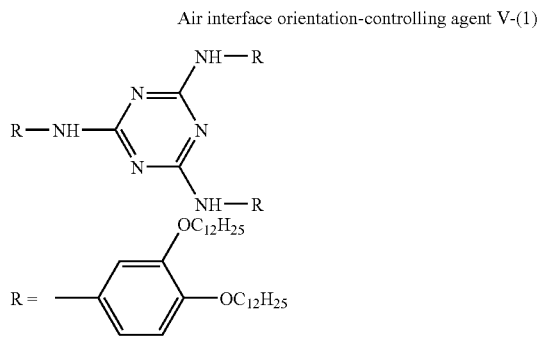

Photo polymerization initiator HJ-1

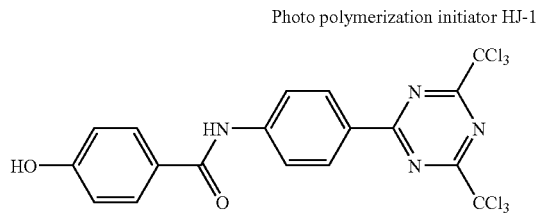

A film having coated thereon the above-described optically anisotropic layer is placed in a 60° C. thermostatic chamber, and the film is heated for about 20 seconds to raise the film temperature to 50° C. and, after keeping intact for 1 minute, the film is placed in a 60° C. thermostatic chamber whose oxygen concentration is 2%. After 30 seconds, the film is irradiated with UV rays in an amount of 600 mJ/cm$^2$ to fix the alignment state of the optically anisotropic layer. Thereafter, the film is allowed to cool to room temperature to prepare a retardation plate. The thickness of the optically anisotropic layer is 1.82 μm.

Biaxial properties and inclined angle in the optically anisotropic layer of the thus-obtained retardation plate are judged under a polarizing microscope, and it is confirmed that the optically anisotropic layer shows biaxial properties, that a direction along which the refractive index is minimal almost coincides with the normal direction of the transparent support, and that the direction scarcely changes in the thickness direction of the transparent support.

Example 3

Effect of the Refractive Index-controlling Agent Satisfying the Foregoing Formula (II)

(Preparation of a Liquid Crystal Composition)

1 g of the biaxial liquid crystal compound (m-3) and 0.2 g of the refractive index-controlling agent (D-1) are dissolved in acetone, followed by removing acetone under reduced pressure to obtain a biaxial liquid crystal composition.

Refractive index-controlling agent (D-1)

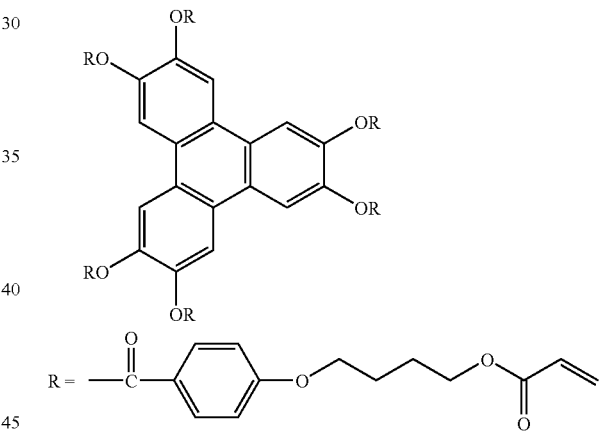

(Confirmation of Biaxial Properties)

This biaxial liquid crystal composition is placed in an orientation cell wherein rubbing directions are anti-parallel, and conoscope observation is conducted under a polarizing microscope at a liquid crystal temperature. Also, only the biaxial liquid crystal compound (m-3) is placed in an orientation cell wherein rubbing directions are anti-parallel, and conoscope observation is conducted under a polarizing microscope. Comparison of the patterns obtained from both of them reveals that they are different in biaxial properties and that the relation therebetween is $(nx-ny)/(ny-nz) < (nx0-ny0)/(ny0-nz0)$.

Example 4

Preparation of a Retardation Plate

A coating solution for the optically anisotropic layer having the following formulation is coated on the alignment film prepared in Example 2 using a #4 wire bar.

| (Coating solution for the optically anisotropic layer) | |
| --- | --- |
| Biaxial liquid crystal compound m-3 | 100 parts by weight |
| Refractive index-controlling agent D-1 | 20 parts by weight |
| Air interface orientation-controlling agent V-(l) shown hereinbefore | 0.2 part by weight |
| Photo polymerization initiator HJ-1 shown hereinbefore | 2.0 parts by weight |
| Lucirin TPO-L (made by BASF) | 2.0 parts by weight |
| Methyl ethyl ketone | 300 parts by weight |

A film having coated thereon the above-described optically anisotropic layer is placed in a 60° C. thermostatic chamber, and the film is heated for about 20 seconds to raise the film temperature to 50° C. and, after keeping intact for 1 minute, the film is placed in a 60° C. thermostatic chamber whose oxygen concentration is 2%. After 30 seconds, the film is irradiated with UV rays in an amount of 600 mJ/cm$^2$ to fix the alignment state of the optically anisotropic layer. Thereafter, the film is allowed to cool to room temperature to prepare a retardation plate. The thickness of the optically anisotropic layer is 1.82 μm.

Biaxial properties and inclined angle in the optically anisotropic layer of the thus-obtained retardation plate are judged under a polarizing microscope with a free pedestal, and it is confirmed that the optically anisotropic layer shows biaxial properties, that a direction along which the refractive index is minimal almost coincides with the normal direction of the transparent support, and that the direction scarcely changes along the thickness direction of the transparent support.

The invention can provide a biaxial liquid crystal composition which permits to arbitrarily control the refractive indexes along the directions of three axes of the biaxial liquid crystal composition without changing the biaxial liquid crystal compound. Further, the invention can provide a polymerization product, a retardation plate and an ellipsoidally polarizing plate using the biaxial liquid crystal composition having controlled refractive indexes along the directions of three axes.

This application is based on Japanese Patent application JP 2003-70304, filed Mar. 14, 2004, and Japanese Patent application JP 2003-70305, filed Mar. 14, 2004, the entire contents of those are hereby incorporated by reference, the same as if set forth at length.

What is claimed is:

1. A biaxial liquid crystal composition comprising at least one liquid crystal compound which develops a liquid crystal phase whose refractive indexes in directions of three axes are different from each other and a refractive index-controlling agent, which is capable of developing a biaxial liquid crystal phase, and has a value of (nx−ny)/(ny−nz) and a value of (nx0−ny0)/(ny0−nz0) different from each other wherein nx, ny and nz respectively represent refractive indexes along directions of three axes of the biaxial liquid crystal composition in an order of magnitude, and nx0, ny0 and nz0 respectively represent refractive indexes along directions of three axes of the biaxial composition obtained by excluding the refractive index-controlling agent from the biaxial liquid crystal composition in an order of magnitude.

2. The biaxial liquid crystal composition according to claim 1, wherein the value of (nx−ny)/(ny−nz) and the value of (nx0−ny0)/(ny0−nz0) satisfy the following formula (I):

$$(nx-ny)/(ny-nz)>(nx0-ny0)/(ny0-nz0).$$

3. The biaxial liquid crystal composition according to claim 1, wherein the refractive index-controlling agent contains a rod-like compound.

4. The biaxial liquid crystal composition according to claim 1, wherein the refractive index-controlling agent is represented by the following formula (I-C):

Q1-L1-Cy1-L2-(Cy2-L3)n-Cy3-L4-Q2 wherein Q1 and Q2 each independently represents a polymerizable group, L1 and L4 each independently represents a divalent linking group, L2 and L3 each independently represents a single bond or a divalent linking group, Cy1, Cy2 and Cy3 each independently represents a divalent cyclic group, and n represents 0, 1 or 2.

5. The biaxial liquid crystal composition according to claim 1, wherein the value of (nx−ny)/(ny−nz) and the value of (nx0−ny0)/(ny0−nz0) satisfy the following formula (II):

$$(nx-ny)/(ny-nz)<(nx0-ny0)/(ny0-nz0).$$

6. The biaxial liquid crystal composition according to claim 1, wherein the refractive index-controlling agent contains a disc-like compound.

7. The biaxial liquid crystal composition according to claim 1, wherein the refractive index-controlling agent is represented by the following formula (I-D):

D(-L-Q)n wherein D represents a disc-like core, L represents a divalent linking group, Q represents a polymerizable group, and n represents an integer of 4 to 12.

8. The biaxial liquid crystal composition according to claim 1, wherein the refractive index-controlling agent is capable of developing a liquid crystal phase.

9. The biaxial liquid crystal composition according to claim 1, wherein the liquid crystal compound has a polymerizable group.

10. The biaxial liquid crystal composition according to claim 1, wherein the refractive index-controlling agent has a polymerizable group.

11. The biaxial liquid crystal composition according to claim 1, wherein the biaxial liquid crystal phase which the biaxial liquid crystal composition develops is a biaxial nematic liquid crystal phase.

12. A retardation plate comprising a transparent support, an alignment film and at least one optically anisotropic layer, wherein the optically anisotropic layer is made of the biaxial liquid crystal composition according to claim 1.

13. An ellipsoidally polarizing plate containing the retardation plate according to claim 12 and a polarizing film.

14. A polymerization product obtained by polymerizing the biaxial liquid crystal composition according to claim 9.

15. A polymerization product obtained by polymerizing the biaxial liquid crystal composition according to claim 10.

* * * * *